(12) United States Patent
Cheriton

(10) Patent No.: US 8,214,795 B2
(45) Date of Patent: Jul. 3, 2012

(54) EFFICIENT AUTOMATED TRANSLATION OF PROCEDURES IN CONSTRAINT-BASED LANGUAGE

(75) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 845 days.

(21) Appl. No.: 12/315,143

(22) Filed: Nov. 26, 2008

(65) Prior Publication Data

US 2010/0131936 A1 May 27, 2010

(51) Int. Cl.
*G06F 9/44* (2006.01)
(52) U.S. Cl. ......... 717/104; 717/100; 717/124; 717/126
(58) Field of Classification Search .................. None
See application file for complete search history.

(56) References Cited

U.S. PATENT DOCUMENTS

| | | | | |
|---|---|---|---|---|
| 5,819,281 | A | 10/1998 | Cummins | |
| 6,513,144 | B1* | 1/2003 | Kim et al. | 716/106 |
| 7,500,226 | B2* | 3/2009 | Tillmann et al. | 717/126 |
| 7,519,952 | B2* | 4/2009 | Bordawekar et al. | 717/124 |
| 7,805,324 | B2* | 9/2010 | Green et al. | 705/7.27 |
| 7,823,119 | B2* | 10/2010 | Suenbuel | 717/100 |
| 2006/0080635 | A1* | 4/2006 | Anwar et al. | 717/100 |
| 2006/0101380 | A1* | 5/2006 | Hussey | 717/104 |
| 2006/0101381 | A1* | 5/2006 | Hussey | 717/104 |
| 2007/0234280 | A1* | 10/2007 | Suenbuel | 717/104 |
| 2009/0293046 | A1* | 11/2009 | Cheriton | 717/136 |
| 2010/0199257 | A1* | 8/2010 | Biggerstaff | 717/104 |

OTHER PUBLICATIONS

Chenouard et al., Model-driven constraint programming, Jul. 2008, pp. 236-246, <http://delivery.acm.org/10.1145/1390000/1389479/p236-chenouard.pdf>.*
Vaziri et al., Associating synchronization constraints with data in an object-oriented language, Jan. 2006, pp. 334-345, <http://delivery.acm.org/10.1145/1120000/1111067/p334-vaziri.pdf>.*
Ramirez et al., Concurrent and distributed programming using constraint logic programs, Mar. 2004, pp. 508-509, <http://delivery.acm.org/10.1145/970000/968005/p508-ramirez.pdf>.*
Nystrom et al., Constrained types for object-oriented languages, Oct. 2008, pp. 457-474, <http://delivery.acm.org/10.1145/1450000/1449800/p457-nystrom.pdf>.*
Granvilliers et al., Symbolic-interval cooperation in constraint programming, Jul. 2001, pp. 150-166, <http://delivery.acm.org/10.1145/390000/384123/p150-granvilliers.pdf>.*
Cabot et al., UMLtoCSP: a tool for the formal verification of UML/OCL models using constraint programming, Nov. 2007, pp. 547-548, <http://delivery.acm.org/10.1145/1330000/1321737/p547-cabot.pdf>.*

(Continued)

*Primary Examiner* — Thuy Dao
(74) *Attorney, Agent, or Firm* — Lumen Patent Firm

(57) ABSTRACT

A method is provided for translating sets of constraint declarations to imperative code sequences based on defining an instantiatable object per set, inserting calls to a notification callback mechanism on state modification and defining calls in the constraint context as imperative code sequences that, in response to these callbacks, take actions to maintain these constraints. This notification and callback mechanism can also be employed in connection with external events, thereby providing for efficient implementation of event-sequenced imperative procedures in a constraint programming language.

7 Claims, 5 Drawing Sheets

OTHER PUBLICATIONS

Horn, "Siri: A Constrained-Object Language for Reactive Program Implementation", 1991.

Fischer et al., "Tasks: Language Support for Event-driven Programming", 2007.

Freeman-Benson at al., "The Design and Implementation of Kaleidoscope'90, a Constraint Imperative Programming Language", 1992, pp. 174-180, Proceedings IEEE Computer Society Intl. Conference Comp. Lang.

Anonymous, "A catalogue of design patterns", Sep. 30, 2005.

Grabmuller, "Constraint Imperative Programming", Feb. 28, 2003, Technical University of Berlin Diploma Thesis.

* cited by examiner

```
class F {
    X;
    Y;
    Z;
} F1, F2;
F1.X = a;
```

Fig. 3a

```
constraintSet CS {
    inputOutput F1, F2;
    output tot, tot2;
    tot = F1.X + F1.Y;
    tot2 = F1.X + F2.Y;
    F1.X = F2.X * F2.Y;
    (F2.Y fixed if F1.X changes);
}
F2.Y = b;
```

Fig. 3b

```
class F {
    X;
    Y;
    Z;
    Notifiee{
        fp;
        virtual onX();
        virtual onY();
        virtual onZ();
    }
    notifieelist;
} F1, F2;
```

Fig. 4a

```
class CS {
    fp1 // initialized to F1 below
    fp2 // initialized to F2 below
    class F1Reactor F::Notifiee{
        onX(){ tot = fp1->X + fp1->Y;
            tot2 = fp1->X + fp2->Y;
            fp2->X = fp1->X / fp2->Y;
        }
        onY(){tot = fp1->X + fp1->Y;}
    } FR1;
    class F2Reactor F::Notifiee{
        onX(){fp1->X = fp2->X * fp2->Y;}
        onY(){tot2 = fp1->X + fp2->Y;
            fp1->X = fp2->X * fp2->Y;
            fp2->X = fp1->X / fp2->Y;
        }
    } FR2;
} cs(F1,F2);
```

Fig. 4b

```
F1.X = a;
FR1.onX();
FR2.onX();
```

Fig. 5a

```
F2.Y = b;
FR2.onY();
FR1.onX();
```

```
callback_a{
    switch(cvar){
        ...
        case i: (current block)
            R
    }
}
```

Fig. 6b

```
callback_a{
    switch(cvar){
        ...
        case i:
            R
            S
    }
}
```

Fig. 7

```
callback_a{
    switch(cvar){
        ...
        case i:
            R
            cvar = clast
    }
    return
}
```

Fig. 8

```
callback_a{
   switch(cvar){
      ...
      case i:
         R
         set exception
         terminate procedure execution
      }
   }
}
```

Fig. 9

```
callback_a{
   switch(cvar){
      ...
      case i:
         R
      case i+1:
         S
      }
   }
}
```

Fig. 10

```
callback_a{
   switch(cvar){
      ...
      case i:
         R
         cvar = block index of label
         goto cvar
      }
   }
}
```

Fig. 11 wait a < b 1.5 {body}
else {timeout}

Fig. 12a

```
callback_a{
    switch(cvar){
        ...
        case i:
            R
            cvar = i+1
            if(a<b) goto L
            return/break
        case i+1:
            if(a<b)
L:              {body}
    }
}
```

Fig. 12b

```
callback_time{
    switch(cvar){
        ...
        case i:
            R
            cvar = i+1
            if(a<b) callback_a
            return/break
        case i+1:
            {timeout}
    }
}
```

Fig. 12c

EFFICIENT AUTOMATED TRANSLATION OF PROCEDURES IN CONSTRAINT-BASED LANGUAGE

FIELD OF THE INVENTION

This invention relates to automatic translation of computer languages.

BACKGROUND

In the development of computer technology, various programming paradigms have been developed. Two of these paradigms are imperative programming and declarative programming. Imperative programming entails providing step by step imperative instructions (e.g., set a equal to 2, increment c, call procedure f( )) which are combined by a programmer to solve the problem of interest. Declarative programming entails providing top level information (e.g., a set of logical constraints to be enforced), which can often be specified in a manner that more transparently relates to the problem of interest. Imperative programming tends to provide improved execution performance, but imperative programs can be very complex and difficult to develop and maintain. Declarative programs tend to be relatively easy to develop and maintain, but declarative programming also tends to provide relatively poor and/or limited execution performance (e.g., slow execution and/or not generally applicable). These relative pros and cons of the imperative and declarative paradigms are well known in the art.

Because the underlying hardware model of a computer is imperative, with the processor(s) executing imperative instructions on passive memory, the earliest programming languages (e.g., assembly language) were imperative, and many of the languages in wide use today (e.g., C, C++) are still largely imperative. At this time, declarative languages (e.g., Prolog, Haskell, Siri and ThingLab) tend to be research languages as opposed to commercial development languages.

In practice, computer languages can include elements of both imperative and declarative paradigms, although the classification of any particular language as primarily imperative or primarily declarative is rarely in doubt. For example, C++ provides classes, virtual functions, and inheritance, which allow a single piece of code to operate on various object types while only being expressed in terms of some base class of these types. This is a declarative aspect of C++, but the C++ language itself is primarily imperative.

Although purely declarative languages have not demonstrated general applicability, impressive results have been obtained in restricted domains. For example, SQL is a restricted-domain declarative language relating to query and update of relational databases. For example, a query is specified by the properties that define a "hit", as opposed to an imperative specification of how to locate such records. SQL is in wide commercial use for database applications. Another limited domain language is JavaFX, which includes an SQL-like trigger mechanism to declare a procedure to be called when a value changes. This facility is apparently restricted to only allowing the definition of triggers on a data element within the current context. These JavaFX triggers are also similar to the "join points" in AspectJ and other so-called aspect-oriented programming languages. These join points allow code to be invoked at the start and end of procedures, during object initialization, field read and write and exception handlers.

Another example of a restricted domain declarative language is that used to specify a grammar to a parser generator. The grammar is specified as declarative production rules. The parser generator translates a program as a set of these production rules into imperative code that implements a parser for the specified grammar. It is clearly declarative in specifying the grammar to recognize, relying on the language translator to determine how to implement the parser. This declarative approach has proven to have significant value in the generation of language translators, avoiding the time-consuming and error prone task of implementing a parser manually. However, the rest of the compiler or interpreter is implemented in a separate imperative programming language, leading to problems associated with using the two different languages and translators together.

The beneficial results provided by declarative programming in certain circumstances have motivated various attempts to provide the main benefits of both paradigms in a single, general purpose programming language. Approaches to date have largely focused on mapping imperative programming constructs into a declarative model (e.g., a run-time constraint solver, as in Kaleidoscope'90). Another example is the Turtle library for C++, where the constraint model of the Turtle language is incorporated into C++. However, such approaches do not appear capable of addressing the inherent inefficiency of a purely declarative programming model.

Accordingly, it would be an advance in the art to provide for general purpose programming making more efficient and systematic use of both imperative and declarative constructs.

SUMMARY

According to embodiments of the present invention, selected aspects of declarative programming are incorporated into an otherwise imperative framework. In particular, declarative specification of constraints is provided. Other important aspects of embodiments of the present invention include automatic resolution of constraints at translation time and separate translation of program units where the program units do not need to know a priori which of their data members are subject to constraints. In many cases of practical interest, constraints specified in a declarative manner can be resolved by a compiler, at compile-time, to provide an imperative program representation that includes automatically provided imperative code for enforcing the constraints. In this manner, the characteristic efficiency of imperative programming is not substantially compromised by adding declarative specification of constraints. Throughout this application, "translation" includes "compilation" and "interpretation", and references to "compilation" etc. are interchangeable with references to "interpretation" etc., unless specifically indicated otherwise.

It is helpful to begin with a summary of some basic concepts of embodiments of the invention with reference to the figures. FIG. 1 shows a pseudo-code example of a known programming construct. In this example, a program unit 102 include a quasi-declarative statement "do A if X changes". As a result of this statement, when a programmer alters X (e.g., in the "set X" line), then the language automatically provides code to "do A" immediately following the "set X" instruction. Throughout the figures, code that is automatically provided by the language is enclosed in dashed lines. The example of FIG. 1 is similar to some known programming constructs (e.g., the triggers of JavaFX).

Conceptually, implementation of the construct of FIG. 1 is relatively straightforward. In particular, when the declarative statement is in the same program unit and same context as the input being changed, as shown, then code to perform A can be automatically inserted by the compiler immediately after every line that alters X. However, there are troublesome conceptual aspects of this construct. In particular, A of this example can be arbitrary imperative code, capable of causing arbitrary changes of state (i.e., arbitrary side effects). Therefore, such constructs have the potential to complicate software development. Another way of making the same point is to observe that "do A" is inherently imperative, so the statement "do A if X changes" is not purely declarative.

The main capability provided by embodiments of the present invention differs from the example of FIG. 1 in two significant respects. The first of these is to specialize to the case of constraints as the declarative statements. This removes the above-described conceptual difficulty, because a constraint is a purely declarative construct. The second of these is to significantly expand the automatic imperative code generation capability to accommodate situations where constraints are in different contexts and/or different program units from their corresponding data members.

FIG. 2 shows an example of these two changes relative to FIG. 1. In the example of FIG. 2, a first program unit 202 includes a declarative specification of a constraint (i.e., the "enforce Y=f(X)" line, and instances of changes to X inside the scope of the constraint and outside the scope of the constraint. A second program unit 204 also includes an instance of a change to X. Embodiments of the invention automatically provide imperative code to "update Y" as shown, for all instances of the change to X. Furthermore, program unit 204 can be separately compiled without advance knowledge of which of its data members are inputs to, or subject to, constraints. This top-level functionality is provided by a notification-reactor construct, schematically shown as 206 on FIG. 2. In implementing construct 206, code for notification and reacting is automatically generated in an intermediate representation automatically derived from the input source program. Further processing of this intermediate representation provides output code that includes automatically generated imperative constructs for enforcing the constraints, thereby relieving the programmer of that burden.

The example of FIGS. 3a-5b shows steps of the above-described process as applied to a specific example. More specifically, a method for automatically translating input code including constraints to a computer executable output program representation, according to an embodiment of the invention, is illustrated in the example of FIGS. 3a-5b.

The first step of this method is to provide an input source program expressed in an imperative programming language that also provides for declarative specification of constraints, where the input source program includes one or more constraints specified in accordance with said programming language. In this example, FIGS. 3a-b show two code fragments of the input source program, where the fragment of FIG. 3a can be in a different context than the fragment of FIG. 3b, and may also be in a separately compiled program unit. C++ like pseudo-code is employed in the figures and the following examples, but practice of the invention does not depend on details of language syntax. The fragment of FIG. 3a includes a definition of a class F, declaration of instances F1 and F2 of F, and an assignment to F1.X. The fragment of FIG. 3b includes a definition of a constraint set CS and an assignment to F2.Y. The constraint set CS includes several constraints: tot is to be equal to F1.X+F1.Y; tot2 is to be equal to F1.X+F2.Y; and F1.X is to be equal to F2.X*F2.Y. It is further specified that F2.Y is to be held fixed if F1.X changes. Constraints are relations of constraint data members (e.g., tot, tot2, F1, F2). Constraint set CS also provides identification of which of the constraint data members are inputs and/or outputs. Here tot and tot2 are exclusively outputs, while F1 and F2 can be both input and output. Identification of constraint inputs can be explicit (as above) and/or implicit. Inputs can be implicitly identified based on their position in a constraint specification (e.g., data members on the right hand side of an equality constraint can be implicitly regarded as constraint inputs).

The second step of this method is to automatically provide constraint representations for the constraints. Each of the constraint representations includes one or more constraint reactor objects for registration for input change notification upon instantiation. The constraint reactor objects include imperative procedures for enforcing the constraints, and are accessible in the scope of the corresponding constraint representation. Here and throughout this application, "including code" is taken to mean literal in-line code inclusion and/or indirectly providing in-scope access to out of scope code (e.g., with pointers). The constraint representations for this example are shown on FIG. 4b, where, as above, dashed lines enclose automatically provided code.

In this example, instance cs of class CS is a constraint representation, and FR1 and FR2 are instances of constraint reactor objects F1Reactor and F2Reactor, respectively. F1Reactor includes code for enforcing constraints (i.e., real updating procedures) when F1 changes. More specifically, if F1.X changes, the onX( ) procedure in F1Reactor imperatively updates tot, tot2, and F2.X in accordance with the constraints. If F1.Y changes, the onY( ) procedure in F1Reactor imperatively updates tot. Similarly, F2Reactor includes code for enforcing constraints when F2 changes. In this example, F1Reactor and F2Reactor are included in class CS, which is instantiated as cs. This instantiation provides FR1 and FR2 with pointer access to the inputs F1 and F2. It is preferred, but not required, to group constraints into constraint sets as in this example. In such situations, there is typically one reactor for each input to the constraint set, each reactor can include imperative statements derived from multiple constraints, and there is one constraint set object representation (e.g., class CS on FIG. 4b) corresponding to each input constraint set (e.g., constraintSet CS on FIG. 3b).

The third step of this method is, for each of some or all program data members of the input source program, automatically providing corresponding notification code to provide change notification and to accommodate registration for input change notification by constraint representations, where the corresponding notification code is accessible in the scope of the corresponding program data member. In this example, FIG. 4a shows a portion of this automatically provided notification code. A subclass Notifiee is inserted within class F, where Notifiee include virtual updating procedures for changes to its inputs (i.e., virtual onX( ), virtual onY( ), and virtual onZ( )), a pointer to its instance (i.e., fp), and a list of instances of constraint reactor objects to be notified when changes occur (i.e., notifieelist). During translation, the notifiee lists are automatically managed so that each data member has a complete list of all and only those reactor instances for which it is an input. The virtual updating procedures are invoked if and only if the corresponding data member changes. Notification capability is typically provided for all data members, even if there are no relevant constraints (e.g., F1.Z, F2.Z have no constraints). This advantageously avoids any requirement of a priori knowledge of which data members of a particular class are involved with constraints. In some cases, it may be desirable to selectively disable notification for some data members. If notification is disabled for a data member that is a constraint input, a translation error is generated.

The fourth step of this method is to instantiate the notification code and the constraint representations in the imperative output program representation, so that changes to constraint inputs automatically lead to imperative constraint-driven updating, and providing the imperative output program representation as an output. For example, this imperative output program representation can be further processed by compilation to a low level machine language.

On FIGS. 4a-b, an important detail is that the F1Reactor and F2Reactor types are derived from the F::Notifiee type. In this manner, calling a virtual updating procedure (e.g., virtual onX( ) in F1::Notifiee) automatically leads to calling the correct constraint updating procedure in the correct reactor (FR1::on(X)) by type inheritance. Operation of the code of this example is shown in the code fragments of FIGS. 5a-b. On FIG. 5a, a programmer provided assignment to F1.X is automatically supplemented with the set of procedure calls shown in dashed lines. Similarly, on FIG. 5b, an assignment to F2.Y is also automatically supplemented with the set of procedure calls shown in dashed lines.

More specifically, changing F1.X on FIG. 5a causes a call to be made to the onX procedure of reactor instance FR1. This FR1.onX( ) procedure updates tot, tot2, and F2.X in accordance with the constraints (by executing assignments tot=F1.X+F1.Y, tot2=F1.X+F2.Y and F2.X=F1.X/F2.Y). The update to F2.X automatically causes a call to be made to the onX( ) procedure of reactor instance FR2. This FR2.onX( ) procedure updates F1.X by executing the assignment F1.X=F2.X*F2.Y. However, this assignment does not actually change the value of F1.X in this example. Therefore, constraint update processing terminates after the call to FR2.onX( ) because that call does not actually change F1.X. To see this more explicitly, suppose (F1.X, F1.Y)=(u, v) and (F2.X, F2.Y)=(w, x) prior to the original assignment to F1.X. This first assignment gives (F1.X, F1.Y)=(a, v). The call to FR1.onX( ) results in (F2.X, F2.Y)=(a/x, x). The call to FR2.onX( ) sets F1.X=F2.X*F2.Y=a, which is the value that F1.X already has at that point in the computation. Since there is no change to F1, no further notification and reacting is needed.

The effect of the assignment F2.Y=b on FIG. 5b can be analyzed in a similar manner. Abbreviating the notation of the previous paragraph, suppose the initial state is F1=(u, v) and F2=(w, x). Changing F2 to (w, b) invokes the onY( ) procedure of reactor FR2, which changes F1 to (w*b, v) and "changes" F2 to (w, b), assuming the change to F1 is made before the change to F2. Since there is no real change to F2, FR1.onX( ) is the only reactor invoked by the changes to F2. This reactor "changes" F2 to (w, b), which is not a change of value for F2. Constraint updating thus terminates.

In the example of FIG. 5b, a different final state is obtained if FR2.onY( ) updates F2 before it updates F1. Under this assumption, the effect of FR2.onY( ) is to set F2 to (u/b, b) and to "change" F1 to (u, v). Since there is no real change to F1, FR2.onX( ) is the only reactor invoked by the changes to F2. FR2.onX( ) "changes" F1 to (u, v), which is not a change of value for F1. Constraint updating thus terminates.

Constraint update processing will typically not terminate unless the computation arrives at a state in which all relevant constraints are simultaneously satisfied. In cases where the constraints are satisfied, the state may not be uniquely specified. Although these aspects of constraint-driven programming are inherent to the underlying declarative paradigm, an important aspect of embodiments of the present invention is the realization that in practice, it can be very powerful to add relatively simple constraints to an imperative framework.

The general model of constraint-driven programming typically treats all constraints as multi-input constraints (e.g., a+b+c=0 can have inputs a, b, and/or c). In many cases of practical interest, a multi-input constraint can be expressed as a set of single-input constraints. This is helpful because single input constraints are more readily implemented in the above-described notification-reactor framework. For example, the constraint a+b+c=0 can be expressed as the following set of single-input constraints: c=−a−b (a is input); a=−b−c (b is input); and b=−c−a (c is input). Such reduction of multi-input constraints to single input constraints can be provided by the programmer, or it can be automatically generated in sufficiently simple cases.

Note that the example of FIGS. 3a-5b included an instance of a multi-input constraint expressed in terms of single input constraints. More specifically, the multi-input constraint F1.X=F2.X*F2.Y was implemented as F2.X=F1.X/F2.Y (F1 is input), F2.X=F1.X/F2.Y (F2 is input), and F1.X=F2.X*F2.Y (F2 is input). This specific representation in terms of single-input constraints is driven by the directive to keep F2.Y fixed if the input F1.X changes, in combination with ordinary lhs/rhs conventions (e.g., a variable on the left hand side (lhs) is typically changed by an assignment, while a variable on the right hand side (rhs) is typically not changed by an assignment). Further considerations relating to constraint complexity are provided in the detailed description.

The preceding description provides an introduction to the main performance characteristics and basic implementation features of typical embodiments of the invention. To better appreciate some variations and refinements of various embodiments of the invention, these will be briefly described in the reminder of the summary below.

In some embodiments, automatically providing notification code in the data members includes providing two or more change notification procedures, and providing for selection of which of these change notification procedures to invoke depending on the nature of the change to the program data member. For example, suppose the program data member V is an array of numbers, and by constraint, total is equal to the sum of the elements of V. In some cases, a change to V is a general change involving some or all of its elements, and in such cases, a full recomputation of total is inevitable during updating. However, in other cases, a change to V is known to be a single element change (e.g., V[3] changes from 4 to 6). In this case, the total can be updated more efficiently (i.e., increment total by 2), since its previous value can be assumed to be correct as a result of prior constraint driven updating. Cases of this nature can be provided for with multiple change notification procedures (e.g., onV( ) and onV[i]( ) for general and single-element updating, respectively). Selection among these notification procedures is driven by the nature of the change to the data member and the circumstances of the change.

There may be cases where the input source program includes constraints where some updates can be can be implemented more efficiently. More specifically, if the input source program includes a declarative specification of a constraint in the same scope as some or all of its inputs, then the constraint can be enforced, within its scope, by automatically inserting in-scope imperative code in the imperative output program representation. Enforcement of such constraints responsive to changes to out-of-scope inputs can be handled as described above.

In practice, it can be advantageous to provide for selecting a thread of program control for execution of each constraint reactor object. Present day programming environments typically provide for such thread selection.

The notification and reactor mechanism can also combine well with other programming approaches. For example, encapsulation of data structures such that changes can only be made through mutator procedures can be helpful in connection with notification as described above, because only the mutator procedures can make changes to state that require constraint-driven updating.

The concept of constraints can be extended to representation specific constraints, which relate to data members having different representations. Here representation refers to how the data member is physically represented. Common representations include normal in-memory, string, untyped, and network representations. Adapters can be employed to translate from one representation to another as needed for monitoring and enforcing constraints.

Constraint-driven imperative updating as described above has numerous applications. Constraints can relate to complex event (e.g., transactions or trades) processing. Constraints can also be employed to specify a grammar for a target programming language in declarative terms. The target programming language may or may not be the input programming language, and may or may not be the language of any intermediate representations employed in automatically practicing embodiments of the invention.

The constraint processing capabilities of embodiments of the invention can be extended by providing a run-time constraint engine to handle constraint sets that are not resolved (i.e., translated to imperative code) during translation. Although this can be helpful in some cases, it is more commonly preferred to avoid reliance on a run-time constraint engine, to preserve the efficiency of imperative programming.

The notification and reactor mechanism described above is not limited to implementation of constraints. Reactors can also contain arbitrary imperative code, although it is preferred that such imperative code at least be idempotent (i.e., executing it 2 or more times on the same inputs has the same effect as executing it once), in order to avoid unintended side effects. Accordingly, some embodiments of the invention include procedure triggers (PTs) in addition to constraints.

In such cases, the PTs are specified in the input source program in accordance with its programming language, and for each PT, its trigger inputs are identified. Each PT includes one or more trigger procedures to be invoked when a corresponding trigger input changes.

Trigger representations for each of the PTs are automatically provided, where the trigger representations include trigger reactor objects for registration for input change notification upon instantiation, the trigger reactor objects including the corresponding trigger procedure. The notification code also accommodates registration for input change notification by trigger representations. The trigger representations are instantiated in the imperative output program representation, so that changes to trigger inputs automatically lead to execution of said trigger procedures. As indicated above, the trigger procedures are preferably idempotent. These trigger representations and trigger reactor objects are analogous to constraint representations and constraint reactor objects, respectively, as described above.

Notification-based constraint set translation provides several significant benefits:

1. Concise expression of relationships and invariants in a programming language, as provided by conventional constraint programming, but with the execution efficiency of carefully manually specified imperative programming, matching the hardware imperative execution model. Extensibility to support automatic maintenance of object relationships, application-specific algorithms, general constraint solving, parser generation, complex event processing, distributed operation and generic interfacing.

2. Control of the grouping of constraint processing by explicit sets of constraints, providing controlled separate scheduled thread execution as well as immediate execution, sharing of notification processing and shared state per constraint set to optimize constraint processing overhead. Conversely, constraints can be partitioned into separate sets to allow concurrent execution as separate sets of constraints.

3. Extensibility to constraints between different representations of state, including network representation, storage representation, generic/type-less identification, string/XML representation, and so on.

4. A unified mechanism for auto-generation of imperative code sequences for both modification of data members as well as constraint maintenance in response to these data members being modified.

In embodiments of the invention, the constraint-driven execution resulting from the translator can go into an infinite loop rather than converge. However, there are many ways an imperative program can end up in an infinite loop without constraints, so this constraint mechanism does not change this fundamental characteristic of imperative programming. The main objective is to provide more concise expression of an imperative program by supporting constraints, not to alter or combat fundamental properties of imperative programs. Moreover, the full power of the imperative language is available to handle cases for which this constraint implementation is less suitable. Finally, in an embodiment including a constraint solver implementation, the solver can be invoked in cases in which its behavior is superior.

According to the above-described principles, constraint programming can be efficiently implemented using imperative programming constructs. Once constraint programming is provided in such a manner, the question can arise of how to deal with situations where a software task includes both constraints and imperative elements (e.g., a procedural power-up sequence for a hardware device) which can most clearly be expressed in imperative form. A first approach is to simply express such imperative elements in the underlying imperative language used for implementing constraint programming. A second approach is to provide constructs within the constraint programming environment that provide for efficient implementation of imperative procedures. This second approach can provide advantages of greater clarity and simplified coding by making the underlying imperative programming environment effectively invisible to a programmer working with the constraint programming environment. In contrast, the first approach could require a programmer to consider two levels of abstraction simultaneously (i.e., the constraint environment and the underlying imperative environment), which can add undesirable complexity to programming and debugging. Preferred embodiments of the present invention can include constructs within the constraint programming environment that provide for efficient implementation of imperative procedures.

The constraint implementation approach described above can be regarded as based on translating the constraints to subroutines of imperative code that are invoked by a trigger mechanism when state on which a constraint depends is changed. Then, a compiled subroutine is simply executed as a result of a callback in response to a variable changing, and the subroutine updates the application state according to the constraint. In this situation, execution can be quite efficient because these subroutines can be compiled in advance to efficient machine code, providing a similarly efficient execution to that of carefully written conventional imperative software. However, this performance is dependent on the primary program activity involving changing the values that one or more constraints depend on, as opposed to the addition and removal of numerous constraints. This is because adding and removing constraints involves registering and deregistering callbacks with the callback notification facility, which is one significant cost, and also allocating and deallocating space to store constraints, which is a second significant cost. Fortunately, many constraint applications can be characterized as mainly involving changes to values of the parameters of the constraint, as opposed to adding and removing constraints with any significant frequency.

Despite the conciseness of constraint programming, there are situations for which it is far more natural and clear to represent the behavior as a procedure that specifies a sequence of actions. For example, a power-up sequence for an appliance requires a series of steps over time that is mostly clearly and concisely represented as a procedure. Often, this sequence requires waiting for a period of time between steps or waiting for a condition to be true, as specified by an expression. In a conventional programming language, one could execute this procedure in the context of a thread that could suspend and resume its execution by some sort of wait construct that allows it to wait for a time interval or a particular condition.

A straightforward representation of an imperative sequence in terms of constraints means adding and removing constraints to effectively drive the constraint solver to transition the program through this power-up sequence as well as some means to record the state of the procedure execution across times in which it is suspended waiting for resumption of execution and a means to recover this state after the condition is satisfied. One example of this approach is referred to as constraint imperative programming (CIP). In conventional CIP, procedural support is provided by modeling the procedure as adding one-time constraints between the state at one time and its state at another. For example, a conventional assignment in a procedure can be modeled as a one-time constraint between the value of the right-hand side at time T and the value of the left-hand side at time T+1. Similarly, waiting for an expression to be true can be modeled as adding a one-time constraint that specifies this expression.

Although this approach can provide correct procedural semantics consistent with a constraint programming environment, it can also lead to an inefficient implementation. In the constraint solver approach, a constraint solver is invoked to re-evaluate the constraint store on each step to determine the effect of adding a new constraint corresponding to the next procedural step and removing the constraint corresponding to the previous. This level of change to the constraint store may defeat the optimizations that are common in a general-purpose constraint solver, making the cost significant. In any event, it is far more expensive than a conventional imperative implementation of a procedure in an imperative programming language.

Even with a constraint implementation where constraints are translated into subroutines that are triggered by a change notification mechanism, as in some embodiments of the invention, procedural code implemented straightforwardly with constraints can lead to significant inefficiencies because one constraint is added and one constraint is removed on each step, incurring significant overhead in registering and deregistering with the change notification mechanism. This contrasts with the case described above in which constraints are relatively rarely added and removed.

In a constraint programming language, it is not feasible to directly translate procedural code to a corresponding conventional procedure implementation in general, because a constraint programming language has no notion of thread of control or invocation of procedural processing. That is, the procedure notion needs to be integrated as an extension of the constraint semantics as above.

In embodiments of the invention, a translator for a constraint imperative computer programming language accepts the specification of one or more procedures and automatically generates code that efficiently executes constraints with semantics consistent with the CIP model.

A procedure can be considered as an aggregation of one-time constraints. However, in an embodiment, a procedure can be specified by the normal procedural programming assignment construct that corresponds to adding and removing a corresponding constraint to/from the constraint store, plus normal control flow statements (if, else, while, etc. and wait) that control the sequence of assignment operations. The "wait" control flow statement has the conventional procedural semantics of suspending the execution until the timeout period or until an optional condition holds before proceeding to subsequent steps in the procedure, (The "wait" statement is considered a control flow statement similar to the conventional goto, return, etc. statements because it determines the control flow, namely suspending the control flow in this case until timeout or the required condition is true.)

In a preferred embodiment, constraints are translated into a callback-based implementation where generated subroutines are invoked by a change notification facility with which these subroutines are registered according to their specified inputs or dependencies.

In a preferred embodiment, a constraint set object type is explicitly declared, specifying inputs and outputs, optionally some local state and one or more constraints triggered by elements specified in the inputs and outputs. A procedure can then be declared in the scope of a constraint set and, as an aggregate constraint, can be specified to be triggered by some expression in terms of input data elements and local state. In this specification, the procedure context state is automatically generated as local state as part of this constraint set. In this setting, no input parameters or return value is specified because these are implicitly those of the constraint set.

In this preferred embodiment, multiple procedures can be declared within a constraint set if each shares the same inputs and outputs. An individual procedure can have a null dependency on one or more of the inputs and a null effect on one or more of the outputs. That is, it can use just a subset of the inputs and outputs. Moreover, a procedure may have one or more local data elements of the constraint set as its parameters/inputs or outputs/return values.

In this preferred embodiment, a procedure declared outside of a constraint set can be realized as a constraint set that contains just the constraints of the procedure and whose input parameters are the inputs of the procedure and whose return values are the outputs of this constraint set and no local variables. That is, it can be realized as the degenerate case of a constraint set that is determined directly from the procedure specification, and is thereby limited. It cannot have local state and cannot share any specification with other procedures.

The following describes the basic translation method (for procedures in a constraint programming language) of some embodiments of the invention, described assuming the embedded constraint set implementation as above. The term subroutine is used to describe an imperative specification that is executable on the underlying computer platform.

To translate a procedure in an constraint programming language implemented using a callback facility to subroutines, on encountering a procedure declaration, the translator generates a procedure context state type containing a case indication variable and other context state that may need to be saved, as elaborated on below. It then generates the declaration of an instance of this context type in the scope of the enclosing constraint set. If the procedure is not declared in the context of an enclosing constraint, it first generates code corresponding to an enclosing constraint set, specifying the inputs and outputs according to the parameters and return values of the procedure, if any. In an embodiment, a special exception output is supported, corresponding to an exception return by the procedure.

The translator also generates a callback subroutine for the procedure for each input, including the timeout callback. Each of these subroutines is arranged to be called back by the change notification facility according to their respective inputs. In an embodiment using an object-oriented structure, the change notification facility allows registering for a callback on an input object, receiving notifications when any notifying data member of said object changes.

Each callback subroutine is generated as a collection of imperative code blocks, each with an "enable" variable that determines whether the code block is to be performed or not on callback. Each block corresponds to the imperative actions of one or more constraints. In one embodiment, the enable is implemented as a conventional "if" statement, i.e.

```
if(enableConstrainti=true) {
   ... constraint imperative code
}
```

In a preferred embodiment, the set of code blocks is generated so that either there is a single code block enabled at any time in a given callback subroutine or else the set of code blocks enabled are consecutive in the subroutine. Consequently, the enablement can be performed by a switch statement such as that available in the C/C++ programming languages, with a case variable that takes on the value corresponding to the first enabled code block. The following description assumes this embodiment. An object-oriented implementation is also assumed in which that callback mechanism supports registering for callbacks from an object (i.e. all its monitored data elements), rather than individual data elements.

During translation, the translator maintains an indication of the current set of callback subroutines and the current blocks and case statements within these callback subroutines. The examples of FIGS. 6a-12c show how translation of various statements can be accomplished in this framework. FIG. 6a shows an input procedure having arguments a, b, and c. FIG. 6b shows a callback subroutine for input "a" of the procedure of FIG. 6a, just after translation of statement R. FIGS. 7-11 show how the callback subroutine of FIG. 6b is modified by the translator depending on statement S of FIG. 6a. Here it is assumed for simplicity that statement R is handled in the callback_a subroutine.

FIG. 7 relates to situations where statement S is not labeled and is not a control flow statement. As indicated above, the translator keeps track of the current block in each of the callback subroutines. In these examples, the current block is taken to be block 'i', and the translation of statement S entails adding S at the end of each current block in each of the callback subroutines. In this example, only the callback subroutine for input argument a is shown, because the callback subroutines for arguments b and c follow the same translation pattern.

FIG. 8 relates to situations where statement S is a return statement. Here translation entails adding code to set the variable of the switch statement to the end case (i.e., cvar=clast), and adding a return statement to each callback subroutine after the main switch statement. In this example, only the callback subroutine for input argument a is shown, because the callback subroutines for arguments b and c follow the same translation pattern.

FIG. 9 relates to situations where statement S is a throw statement. Here translation entails adding code to set an exception according to any parameter(s) provided by the throw statement, and adding code to terminate execution, in each of the callback procedures. In this example, only the callback subroutine for input argument a is shown, because the callback subroutines for arguments b and c follow the same translation pattern.

FIG. 10 relates to situations where statement S is a labeled statement (i.e., a possible point of entry). Here translation entails allocating a new case number (here 'i+1'), adding code to start a new case block (here case i+1), and adding code for statement S to the new case block, all of these actions taking place in each relevant callback procedure. Preferably, as in this example, execution from case i simply falls through to case i+1 according to standard C/C++ switch statement semantics. In this example, only the callback subroutine for input argument a is shown, because the callback subroutines for arguments b and c follow the same translation pattern. In a preferred embodiment, the case variable is set to the new block number (i.e., cvar=i+1), so that the case variable is guaranteed to indicate the current block. Such consistency can be helpful for exception handling.

FIG. 11 relates to situations where statement S is a goto statement. Here translation entails adding code to set the case variable to the case corresponding to the specified label, to notify the appropriate condition, and to return, all of these actions taking place in each relevant callback procedure. Notification of the appropriate condition includes various possibilities for transferring program control to the indicated entry point. For entry points in the same procedure, a conventional goto construct can be employed (as in the example of FIG. 12b). For an entry point in a different procedure, a direct call can be made to the subroutine containing the desired case (as in the example of FIG. 12c). Another way to reach an entry point in a different procedure is to call a "signal" routine that indirectly invokes the associated callback subroutine by way of the notification and callback mechanism (e.g., flag variable a as having a changed value in order to have callback_a invoked by the notification and callback mechanism). In this example, only the callback subroutine for input argument a is shown, because the callback subroutines for arguments b and c follow the same translation pattern.

FIG. 12a-c relate to situations where statement S is a wait statement. FIG. 12a shows an example wait statement. FIGS. 12b-c show callback routines corresponding to a situation where statement S of FIG. 6a is the wait statement of FIG. 12a. In this example, the wait statement include a conditional test (i.e., a<b), a time-out parameter (i.e., 1.5), a "body" which is executed if the conditional test becomes true before the elapsed time from the calling of the wait statement exceeds the time-out parameter, and a "timeout" which is executed if the conditional test does not become true before the elapsed time from the calling of the wait statement exceeds the time-out parameter. Here translation entails the following:

1) In each callback subroutine corresponding to an input to the conditional (i.e., callback_a and callback_b, but not callback_c), assign a case number for subsequent execution (i.e., i+1), add a case block having the new case number and including code to execute the "body" of the wait statement if the conditional test is true. In the current block, add code to execute the wait "body" if the wait conditional test is already satisfied. In the current block (i.e., block i), add code to set the current block for subsequent processing to be the new block (i.e., cvar=i+1). Terminate the current block with a return or break statement. FIG. 12b shows the effect of step 1 above on this example.

2) In the time-out callback subroutine, assign a case number for subsequent execution (i.e., i+1), add a case block having the new case number and including code to execute the "timeout" of the wait statement. In the current block (i.e., block i), add code to test the wait conditional (and jump to the wait body if the conditional is true) and to set the current block for subsequent processing to be the new block (i.e., cvar=i+1). Terminate the current block with a return or break statement. FIG. 12c shows the effect of step 2 above on this example. In some cases, it may be impossible for the current block (i.e., block i) in the callback_time procedure to be reached. In these cases, the translator can omit the current block from the callback_time procedure as an optimization. In the example of FIGS. 12a-c, it may be helpful to note that the translated wait statement can be regarded as being included in two case blocks—the end of the current block (e.g., block i) and the beginning of the next block (e.g., block i+1).

In these examples, it is important to note that the value of the case variable (i.e., cvar) for a callback subroutine is not affected by merely exiting from the callback subroutine and then later calling the callback subroutine again. Thus, in the example of FIG. 12, the wait semantics are provided by the callback mechanism as follows. When code corresponding to the wait statement is encountered in the callback subroutines, the wait conditional test is first checked. If the wait conditional test is true, the wait body is executed and execution proceeds. If the wait conditional test is false, processing in the callback subroutines is halted by a return/break statement. Furthermore, the case variables of the callback subroutines corresponding to inputs to the wait conditional test are set such that any change to one of these inputs results in another check being made of the wait conditional test. If any such test come up true, the wait body is executed and then execution proceeds.

Meanwhile, the time callback is checked in a manner determined by changes of state of appropriate timing variables. For example, when a wait statement is called, the time at which it was called can be saved, and the timeout callback subroutine can have a system time variable that is periodically updated as its input. Changes to this system time variable will then cause execution of the timeout callback, which will execute the timeout branch of the wait statement if a time-out occurs. Appropriate use of state variables, e.g., as described in Examples 28-34 below, is the preferred way to ensure that once the "body" branch of a wait statement is executed, it is impossible for the "timeout" branch of that wait statement to be executed. In some embodiments, each constraint set has its own timeout variable, and each constraint set is implemented on a single thread of control. In this situation, the constraint set thread is either executing a callback subroutine or a timeout subroutine, thereby eliminating the possibility of executing both a "body" and a "timeout" for the same wait statement.

The translator maintains a list of previous code blocks nested in the current scope that were not terminated by a return or a throw statement. On exit from this scope, such as the end of an else statement, if there are such previous code blocks, on encountering a new executable statement, it creates a case block to contain this new executable statement, it includes code to set the case variable to this case in each of these blocks so they each transfer control to the new case block, and it then removes these blocks from its collection of previous code blocks. When the end of the procedure is encountered, the translator adds statements to any code blocks remaining in this list of unterminated blocks to cause them to transfer to the termination state of the procedure.

The translator also adds the saving of any local procedure variables that are "live" (i.e. active) at the point of a wait and adds code to restore each of these variables in each new case block in which they are live, extending the fields in the context state type as necessary.

In a preferred embodiment, the input specification can include structured control flow constructs such as for and while loops. These can be translated to the goto construct using compiler techniques well known in the art, and then the resulting goto constructs can be handled as described above.

In an embodiment, the translator generates an initiation subroutine corresponding to the initial steps of a procedure up to the first wait or label in the procedure, which performs these steps and then arranges for transfer of control to subsequent steps using the above-described control flow implementation (i.e. setting the case variable and arranging for callbacks on the relevant conditions). Consequently a procedure containing no labels or wait statement is translated to this single subroutine.

In a preferred embodiment, when a procedure is triggered to start execution when it is not in an initial state, it takes no action. Optionally, it can be specified to set the exception output. This case does not arise with procedures not embedded in the scope of a constraint set because a new constraint set is instantiated with its procedure context in this initial state on each "call", as described below in connection with Examples 28-34.

Embodiments of the invention allow procedures as an imperative construct to be specified in a constraint programming language, supporting normal procedural semantics, including the ability to conditionally suspend execution waiting for a time period or a condition expression to become true, yet translated automatically into conventional subroutines to be executed with efficiency comparable to efficient conventional imperative programming. Such efficiency is a significant advantage provided by embodiments of the invention compared to other ways of providing for procedures in a constraint programming language.

In effect, the execution of the callback subroutines to realize the execution of a procedure can be regarded as being implemented by a specialized logical processor where the case numbers of the cases in the callback subroutines can be regarded as application-specific instruction codes, the callback subroutines as application-specific instruction execution means and the context state data as an application-specific context. Consequently, a procedure translated per the above-described principles only incurs the minimal overhead of context saving and restoring and space as required by the specifics of this procedure.

On the other hand, invoking a procedure that is specified outside of a constraint set scope is somewhat more expensive because, in the general case, the implicit constraint set needs to be dynamically instantiated/allocated, inputs need to be registered for callbacks, and the caller needs to wait for the procedure to complete, deregistering and freeing these resources on procedure completion.

It is helpful to regard "event-sequenced imperative procedures" as being imperative procedures that have some dependence on external events. Such procedures are commonly encountered in practice (e.g., a device initialization procedure that checks for a time out condition). From this point of view, the preceding principles (and examples 28-34 below) can be regarded as extending the idea of providing notification and callback code for constraints to also providing notification and callback code for events.

More specifically, an input source program can be expressed in a constraint programming language that also provides for specification of event-sequenced imperative procedures. The input source program can be automatically translated to an intermediate imperative representation, where notification and callback code for constraints in the intermediate representation provides efficient implementation of constraints, and where notification and callback code for events in the intermediate representation provides efficient implementation of event-sequenced imperative procedures. This imperative intermediate representation can be automatically translated to a computer executable imperative output representation, which in turn can be provided as an output (e.g., to a user).

The conditional wait construct as described above can be employed to provide a thread of control within a constraint framework. For example, a call to an event-sequenced imperative procedure can be translated to initiation of procedure execution followed by a conditional wait construct that returns execution to the point following the procedure call upon termination of the called event-sequenced imperative procedure.

Further description of these and other aspects of embodiments of the invention is provided below.

BRIEF DESCRIPTION OF THE DRAWINGS

FIGS. 3a-b show input code segments for an example relating to an embodiment of the invention.

FIGS. 4a-b show automatically generated representations corresponding to the input code segments of the example of FIGS. 3a-b.

FIGS. 5a-b show imperative output program representations corresponding to the input code segments of the example of FIGS. 3a-b and 4a-b.

FIGS. 6a-12c show examples of translation of control flow statements according to embodiments of the invention.

DETAILED DESCRIPTION

Figure 1:
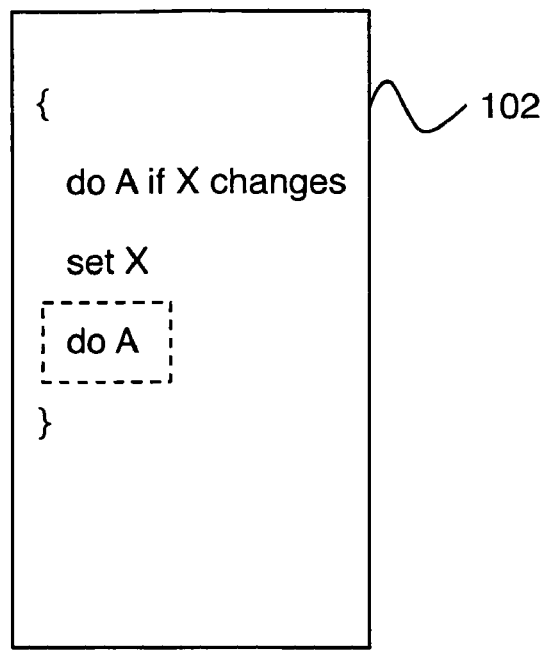
FIG. 1 shows an example of a known programming construct.
Figure 2:
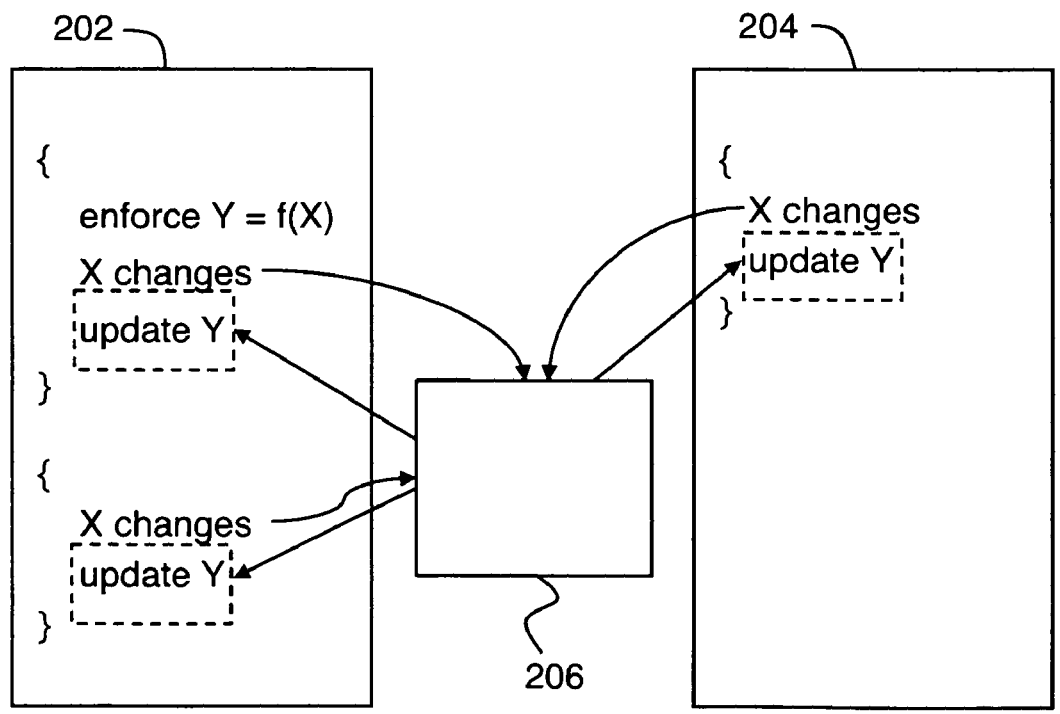
FIG. 2 shows an example of functionality provided by an embodiment of the present invention.

In an embodiment of the invention, a programming language includes one or more constructs for specifying a set of constraints, referred to as a constraint set. By "constraint" is meant a declarative specification of a relationship between data members that is required to hold, either at all times or at a special time or times. In the former case, a constraint is equivalent in nature to an invariant. An example of the latter is a relationship that only holds on initialization of some data member. Another example is a constraint that refers to a data member in another object; the constraint can only hold when that other object is known. By "active constraint" is meant a constraint where imperative actions are taken to establish and maintain that relationship as state relevant to the relationship changes. In contrast to an active constraint, a passive or checking constraint simply generates an error or exception indication when the relationship is detected not to hold. The nature of the relationship can be indicated by a constraint operator. For example, an equality relationship can be indicated by the "=" operator.

The term "data member" is used to designate a named state cell that is capable of storing data. It is termed a "member" because it is a member of a scope for the name, such as a type, name space or procedure. This term is also used in the C++ programming language. However, use of this term does not restrict embodiments to an extension of C++ or any derivative thereof.

In one embodiment, the programming language provides the conventional features of an object-oriented language, including classes, inheritance, dynamic function (virtual function) dispatch, further extended with a constraintSet construct and a constraint context per data member. The constraintSet construct may be indicated by the keyword "constraintSet" and can otherwise follow the syntax of a type specification in the language. The data member context may be indicated as starting with a "{" symbol immediately following the declaration of a data member and terminated by the symbol "}". Other embodiments can use different syntax, such as a "begin" and "end" keywords and an explicit specification of the constrained data member, rather than having it implicitly coupled to the declaration of the data member as above. With a constraintSet, local names for the objects referenced by the constraints in the set can be defined. In one embodiment, the "input" keyword qualifier is used before the type indication in the declaration of a local data member in a constraint set, indicating a data member that is only used as input (read-only) to constraints in the set, "output" is used if the local variable is only written in the constraint set, and "inputOutput" is used if constraints in the set may cause this object to be both read and written. For example, in Example 1, a simple constraintSet "ReportMaintenance"

EXAMPLE 1
ConstraintSet Specification

```
constraintSet ReportMaintenance {
    input Inventory inventory;
    input Accounting accounting;
    inputOutput Report report;
        report->total = inventory->part{
        'isAppliedOnAudit = true;
        'isScheduled = false;
    }
    report->cost = report->total*accounting->avgPrice;
}
``` specifies constraints between a report on total parts and cost and the collection part in an inventory. (Here, the "part" data member in inventory designates a collection with an entry per type of part in the inventory object, each providing a count of the number of parts of that type in the inventory.) When the ReportMaintenance constraint set is instantiated with specified inventory, accounting and report objects, the constrained data members of total and cost are set according to the relationships specified by these constraints and then subsequently maintained when any of the referenced data members change.

A constraint may be specified with a subcontext in which one or more properties of the constraint are specified, as in Example 1. Here, the property of being applied during audit is set to true, causing the translator to generate audit code to check that the specified constraint holds during a software audit. A second property, "isScheduled" is set to false to indicate that the associated constraint processing is always invoked immediately, not on a separate thread (as is discussed below).

This example illustrates the key benefits of the constraint facility. It allows the programmer to specify the desired value of report (i.e. what is required), making the semantics more clear to any reviewer of the software. It also relieves the programmer of determining all the locations in the software that the input data members are changed and manually inserting code to perform the constraint maintenance at these points. In this vein, it avoids the problem of a modification to the software inadvertently adding an input change without adding the corresponding update code. It also relieves the programmer of writing the constraint imperative code so that it correctly maintains the relationship for all combinations of changes to inputs. Thus, automatic constraint-driven updating reduces the cost of development, reduces the probability of errors and improves the readability, and thus the maintainability, of the software. At the same time, the resulting implementation can be as efficient as a conventional imperative realization.

A constraint set can also be defined as an extension of a previously defined constraint set, as illustrated in Example 2, referred to as an extended constraint set.

---
EXAMPLE 2
Extended ConstraintSet Specification
---

```
constraintSet ExtendedReportMaintenance ReportMaintenance {
    inputOutput Supervisor supervisor;
    supervisor->attention = (report->cost > supervisor->costLimit);
    report->cost =
    report->total*accounting->avgPrice − accounting->overhead;
}
```

In this example, an additional inputOutput object "supervisor" is defined and the constraint on report::cost is redefined.

The explicit specification of constraint sets allows constraints to be grouped based on having common inputs, common outputs, a common allocation of processing priority and possibly other properties such as memory allocation.

The following description describes in greater detail implementation of constraint sets to provide the key benefits of declarative specification, namely conciseness of specification, without the key disadvantage of a declarative language, namely inefficiency of implementation, and without significant limitations on constraint scope, such as being restricted to just local instance variables.

A. ConstraintSet Realization

In a preferred embodiment, the translator generates an internal representation of a constraintSet as a class with the specified name. For example, the internal representation for the constraintSet of Example 1 could be specified using C++ as ---
EXAMPLE 3
ConstraintSet realization as a C++ Class
---

```
class ReportMaintenance : public Fwk::RootConstraintSet {
    Thread * thread_;
    ...
}
``` where the base class "Fwk::RootConstraintSet" provides a base set of functionality common to all constraint sets. The "thread_" data member indicates the processing resource that the procedures associated with this constraint set is to execute on. Here, the designation " . . . " indicates additional implementation in C++ required to complete the implementation, which is described further below. The designations of public, protected, etc. required in C++ are omitted for brevity as are the indications of pointer and "const".

An extended constraint set can be realized as a class that inherits from the class corresponding to the constraint set that it extends, as illustrated in a C++ representation in Example 4.

---
EXAMPLE 4
Extended Constraint Set realization using Inheritance
---

```
class ExtendedReportMaintenance : public ReportMaintenance {
    ...
}
```

In an embodiment, the implementation relies on a uniform notification mechanism to determine when an input has changed, requiring processing to ensure that the constraints in the constraint set are maintained. This is described next.

A.0 Notification-Based Constraint Implementation

In an embodiment, the translator employs a uniform callback mechanism referred to as the notification facility that provides the ability to register a procedure to be invoked when a data member is modified. When an object is specified as an input in a constraint set, the translator defines a callback procedure that performs the required processing for this constraint when a data member in this object is changed and generates imperative instructions to register this procedure for call back from this object.

The notification facility can be realized in general by what is referred to as the "listener" design pattern. In a particular embodiment, the translator generates for each object type Foo an internal representation of a callback interface for Foo with a callback prototype function for each data member of Foo that can serve as an input. For example, the internal representation for callback interface for Inventory type can be specified using C++ as a nested class Notifiee, as in Example 5.

---
EXAMPLE 5
Notification Callback Interface as a C++ Class
---

```
class Inventory {
    ...
    class Notifiee {
    public:
        virtual void onPart( String key ) { }
        virtual void onPart( ) { }
    };
    Notifiee notifieeList;
}
```

The "onPart" virtual functions correspond to the "part" data member of the Inventory class and do nothing by default. The one with a parameter corresponds to a known specified entry changing and the other corresponds to an unknown set of changes to the part collection.

The translator also adds a "notifieeList" to the internal representation of the Inventory type that stores a list of Inventory::Notifiee instances. Each such Notifiee instance is also a reactor instance defined as a derived type of the Notifiee type, as described in greater detail below. Finally, the translator inserts in the internal representation of a program at every point that a data member "dm" can be modified, an iteration over its corresponding notifieeList, calling the "on" virtual function for dm for each object in this list, if any. For example, the internal representation for this inserted code for the case of the Inventory::part entry designated by "key" can be specified using C++ as in Example 6.

EXAMPLE 6
Notification Callback procedure in change to Inventory::part

```
for(NotifieeListIterator i=notifieeListIter( );i;++i) {
    i->onPart(key);
}
```

This code is only invoked if the part entry specified by key has actually changed. In particular, a processing sequence that sets this entry to its current value does not generate a notification callback.

To realize the constraintSet of Example 1, the translator automatically generates an internal representation of each input derived from the notifiee interface for each input, replacing the default null "on" function for each data member that appears as an input to a constraint with one that performs the required imperative actions to enforce the constraints in the constraint set when that data member is modified. For example, for input inventory::part, this internal representation can be specified using C++-like code as a nested class derived from Inventory::Notifiee, overriding the "onPart" function to perform the required processing, as indicated in Example 7, repeating class context specified in Example 3.

EXAMPLE 7
C++ Internal Representation of the Inventory::part Input

```
class ReportMaintenance : public Fwk::RootConstraintSet {
    Thread * thread_;
    Count oldPart_[Key];
    class InventoryReactor : public Inventory::Notifiee {
        void onPart( Key key ) {
            Count newVal = inventory->part[key];
            Count diff = newVal-oldPart[key];
            cs_->report->total = cs_->report->total + diff;
            oldPart[key] = newVal;
        }
        void onPart( ) {
            Count sum = 0;
            if(inventory_) {
                for(PartIterator i=inventory_->partIter( );i;++i) {
                    Count newVal = i.value( );
                    sum += newVal;
                    oldPart[i.key] = newVal;
                }
            }
            cs_->report->total = sum;
        }
        ReportMaintenance * cs_;
        Inventory * inventory_;
        void inventoryIs( Inventory * inv ) {
            inventory_->notifieeListDel(this);
            inventory_ = inv;
            inventory_->notifieeListInsert(this);
        }
    };
    DataMemberId notifyingDataMember_;
    Key notifyingDataMemberKey_;
    Inventory * inventory( ) { return inventoryReactor_->inventory_; }
    void inventoryIs( Inventory * inv ) {
        inventoryReactor_->inventoryIs(inv);
        inventoryReactor_->onPart( );
    }
    InventoryReactor * inventoryReactor_;
    Report * report;
    ...
}
```

The InventoryReactor class derives from the Inventory::Notifiee class, allowing it to override or replace the implementation of the "onPart" callback functions by type inheritance. The "oldPart" is an array data member indexed by key that is added by the translator and is used as an optimization in the constraint implementation, illustrating the addition of state to a constraint set as part of the constraint implementation.

In the case of a specified entry of "part" changing, the total in the report can be updated efficiently based on the difference to the old value stored in the constraint set class. In the case of unspecified changes to the "part" collection, the total is completely recomputed, refreshing the "oldPart" values in the context of the constraint set. The translator defines the InventoryReactor class to contain an "inventory" data member that is initialized to refer to the associated inventory when it is instantiated. It also defines data members to indicate a notifying data member and the key associated with the notifying data member, for each collection data member, used to store these values by scheduled notifications described later.

As illustrated in Example 7, an input is realized as a data member called "inventoryReactor" that is actually an instance of the InventoryReactor class that contains a pointer to the actual Inventory object. In an embodiment, functions are provided for accessing and modifying this input. In particular, the "inventoryIs" function modifies the associated inventory object, calling the associated "onPart( )" function to recompute the total in the report when the inventory object is changed. Moreover, the effect of writing to the inventory field in an InventoryReactor instance is to remove this reactor instance from the notifieeList in the current inventory object and to add this reactor instance to the notifiee list of the new inventory object referenced by the inventory field. (Consideration of the inventory object being null in either case is omitted for the sake of brevity.)

The reference to the "report" output is accessed in the reactor type indirectly by a back pointer to the enclosing constraint set class instance, as specified by the "cs_" data member, which is initialized to point to this instance when the reactor object is instantiated. An embodiment could instead provide a data member local to the reactor that refers to inputs and outputs other than that which serves as the notifying object for this reactor. However, there needs then to be a means that updates this local data member when the actual input, such as "report" is changed.

Example 7 illustrates how a constraint implementation can be optimized by providing state, oldPart in this case, in context associated with a constraint set. In the case of other constraints, such as one that specifies an output as an approximation of the first derivative of an input, the constraint set may require extra state to perform the required computation.

In the case of an input that is specified as a collection, the corresponding internal representation could use a reactor class as the entry type for the collection, including "next" pointer and key fields as required for the collection implementation. That is, the reactor class is used in place of the "entry" structure used to implement non-invasive collection data structures such as hash tables, trees and linked lists, saving on space and extra code compared to using a separate entry object.

In an embodiment, an internal representation would include a constructor procedure for a constraint set that would initialize the state of the constraint set with the required reactor instances. In particular, in Example 7, this constructor procedure would instantiate InventoryReactor for the inventory input and set the inventoryReactor_ data member to point to this reactor instance.

Reviewing the above realization, the first constraint of the constraint set specified in Example 1 is maintained as follows when a specified part entry in the inventory is changed. The change invokes the code inserted at this location to iterate over the notifiee list, invoking the "onPart" function in the context of each object in the list, with the key identifying this entry. If the ReportMaintenance constraint set is instantiated with this inventory object, an instance of the InventoryReactor class generated for this constraint set is present in this notifiee list. When the "onPart" function is invoked for this object, the reactor implementation of this function is invoked, as implemented in Example 7, causing the "total" data member in the report object to be updated.

The second constraint in Example 1 would be triggered by a change to the report total. This constraint can be implemented with a similar structure, with a reactor for the report total data member as well as the accounting "avgPrice" data member. Thus, the update to total would cause a call to a reactor that would cause the "cost" data member in report to be recomputed by an implementation of a "onTotal" function.

As an optimization, an embodiment may determine for this constraint set implementation that updating report→total also entails an update to report→cost, and report→total is not updated by any other means. Thus, the implementation may omit a separate reactor for report→cost driven by changes to report→total and simply update the report cost as part of the functions that maintain report total as illustrated by an extended version of "onPart" in Example 8.

---

EXAMPLE 8
Optimized C++ Internal Representation of "onPart"

---

```
void onPart( Key key ) {
   Count newVal = inventory->part[key];
   Count diff = newVal-oldPart[key];
   cs -> report->total = cs -> report->total + diff;
   oldPart[key] = newVal;
   cs -> report->cost = cs_-> report->total*cs- > accounting->avgPrice;
}
```

Here, the last line of this function implementation directly updates the report "cost" data member rather than relying on a callback notification from the "cost" data member itself. The implementation of the second constraint would still require a reactor instance to react to change to the "avgPrice" data member in the accounting object.

In some constraint sets, multiple constraints have one or more inputs in common. In this case, the imperative code for each of the constraints in the constraint set with a common input data member "dm" can be combined into the implementation of the callback function "onDm" defined in the reactor for this input. The imperative code can be combined by inserting the imperative code for each constraint using this data member dm in the sequence that the constraints appear in the constraint set. In this way, a single callback and reactor is required per instance of the entire constraint set.

In a preferred embodiment, the translator implements multiple optimizations across all the constraints in the constraint set to minimize overhead, using the techniques illustrated above as well as other common optimizations, such as common subexpression elimination.

In a particular embodiment, local data members can be specified in the scope of a constraintSet and constraints can be defined to use these as inputs and/or outputs. The translator can recognize when an input to the constraint is a local data member and cause the associated imperative code to be directly invoked from the locations in the current module at which said data member is modified. This optimization eliminates the overhead of invoking the imperative code sequence through the notification mechanism and a reactor type.

With separate translation or compilation, a standard requirement for practical programming, one or more of the dependent data members and code accessing these data members may be implemented in separately translated modules. Such separately translated code cannot be modified directly by the current translation process. In particular, it is not possible to add code to these separate modules to implement the constraints. Using the notification facility, a separately translated unit provides a means for any constraint set in a separate module to determine when any data member that it is dependent on has changed without this separately compiled unit knowing at the time it is translated what constraints, if any, are to be specified and present during program execution. The extra cost for updating a data member dm in the case of no such constraints is that of checking the notifiee callback list and possibly calling a null function. The cost in the case of one or more constraints using this data member as an input is that of invoking the constraint-generated imperative code to ensure that the constraint invariant still holds, i.e. taking any necessary action to make the constraint true. This processing cost is the same as if this imperative code had been explicitly specified by the programmer. In essence, this approach extends the passive memory or state of conventional imperative programming with this notification mechanism to support constraints, and contrasts sharply with conventional approaches for merging constraint and imperative programming that have relied on the inefficient constraint graph approach of constraint programming (with its run-time constraint store and constraint solver) to incorporate imperative programming.

In an embodiment, the notification facility can be implemented with a Notifiee interface per data member of the type and either a separate notifieeList per data member or a shared list with some means of indicating the data member of interest per object. Correspondingly, there can be a reactor object per data member of interest. This alternative reduces the callbacks to data members that are not of interest compared to the reactor per input object but increases the space cost and complexity when multiple data members are used in a constraint set.

A.1 Reactor Execution

A constraint set can have an associated thread specification, which designates the thread(s) to use in executing the reactor procedures. Such a specification can lead to a "thread" data member being inserted by the translator as part of the realization of a constraint set, as arose in Example 3. In a particular embodiment, if the thread data member is non-null, the reactor object is queued on the thread for subsequent execution (i.e. scheduling) rather than its "on" functions being invoked directly. The reactor includes a single entry recording the data member that is notifying as well as the key of the data member in the case of a collection.

In one embodiment, a reactor can be optionally scheduled on a separate thread. The translator generates a unique identifier for each notifying data member. It also generates a demultiplexing procedure for the reactor type that has a data member identifier parameter whose implementation selects based on the data member identifier and invokes the "on" function for the specified data member. This procedure also recognizes a specialized "this_" data member identifier that corresponds to object scope. When invoked with this value, the procedure invokes each "on" procedure in the reactor, passing no parameters. (I.e. with a collection data member, the no-parameter "on" function is invoked.) The imperative code in the reactor implementation for the "onPart" function supporting thread scheduling is illustrated in Example 9

EXAMPLE 9
C++ Internal Representation of a Schedule "onPart" Implementation

```
void onPart( Key key ) {
    if(cs_->thread&&(currentThread!=cs->thread)) {
        if(isEnqueued( )) {
            notifyingDataMemberIs(this_);
        }
        else {
            cs_->notifyingKeyIs(key);
            cs_->thread->enqueueReactor(this,part_);
        }
        return;
    }
    Count newVal = inventory->part[key];
    Count diff = newVal-oldPart[key];
    cs->report->total = cs->report->total + diff;
    oldPart[key] = newVal;
    cs->report->cost = cs->report->total*cs->accounting->avgPrice;
}
```

If the thread data member is non-null and is not the current thread, the invocation of "onPart" is deferred to be executed by a subsequent thread-scheduled execution. To achieve this, the reactor itself is enqueued on the specified thread if it is not already enqueued, along with an identifier of the notifying data member, "part" in this case, and its key value if any. If the reactor is already enqueued on the specified thread, the notifying data member indicator is changed to "this_" to indicate an object-level notification. Subsequently when the specified thread is scheduled to execute this reactor type, it invokes the demultiplexing procedure to map the data member identifier to the associated "on" function and executes it. If the notifying data member is specified as "this_", each of the "on" functions are invoked. Because this thread is then the current thread when this "on" function is executed, the imperative implementation of the reactor "on" function is executed immediately when invoked by this thread.

Using this mechanism, a constraint set can be configured at run-time to perform either separately scheduled notification processing or immediate notification, selected by setting the thread data member to a non-null value or clearing it. For instance, under load, a constraint set can dynamically allocate a thread and set this thread data member to cause its execution to take place in parallel to the processing in its inputs, increasing the parallelism and response time of the application. Also, an application can be configured at run-time based on the number of parallel threads available for its execution, using separately scheduled constraint execution when sufficient parallel threads are available.

A key problem with a general procedure trigger mechanism arises from the processing requirements of the trigger-invoked procedure. If the triggered procedure is executed in the same thread of control as the action invoking the trigger, the action completion is delayed by this processing, and consequently the whole application task being performed is delayed, detracting from application performance. In some cases, the result is the application failing to meet response requirements. The alternative is to queue the trigger event for subsequent processing by a separate thread of control. However, under load, the rate of trigger generation can exceed the rate of processing these trigger events. In this case, either the queue grows without bound until the system is out of memory or else the queue reaches a limit and blocks the triggering action or trigger events are dropped. None of these alternatives are acceptable in general. The first clearly leads to system failure. The second can cause blocking of the application. Also, it is common for many of the queued triggers to be redundant. For example, in a network system, a link can "flap" up and down rapidly, causing a sequence of triggering events corresponding to the link state changing. However, the processing often is only concerned about the current state of the link, not the entire sequence of events. A triggering mechanism can include options to indicate when this is the case, an option to coalesce repeated events and complementary events, but this increases the execution cost substantially and does not eliminate the general problem of hitting the queue limit. The final option of discarding trigger events means that the triggered procedure is not called in some cases in which the programmer designated it to be called. This alternative also leads to incorrect application behavior in the general case. The lack of reasonable semantics may be the reason that a trigger mechanism is not provided in any general-purpose practical programming language even though the concept has been around and used in various specialized languages. For instance, JavaFX is designed for graphical user interfaces in which performance is typically not a key concern.

Notification-based processing, as described above, can avoid these problems of a general procedure trigger mechanism by several key technical features of preferred embodiments. First, the processing action of each notification is restricted by constraint semantics to "ensuring" the constraint relationship holds, not performing an arbitrary action. Thus, each "on" function is idempotent so extra invocations of an "on" function do not cause incorrect behavior. Second, when a second notification to a reactor object is received before the current one is processed, the notification is effectively collapsed into an object notification, meaning one or more of the data members of the notifying object have changed, by changing the notifyingDataMember indication to "this_". Third, when a thread is dispatched to perform scheduled notification processing with a "this_" indication, it invokes every one of the zero-parameter "on" functions in the reactor, ensuring that all the constraints with this notifying object as input are maintained. Fourth, the notification processing retrieves the current value of the notifying data member, if required, from the notifying object itself rather than relying on a queued value thereby ensuring use of the current value. Finally, any update action that is performed as part of this notification processing that does not actually change the target data member does not cause a notification because of the careful implementation of notifications. Consequently, constraints are maintained (eventually) even in an overload situation because a superset of the required notification processing is performed when the thread is scheduled even though the actual specific triggering events may be forgotten. Moreover, any extra processing does not induce incorrect behavior because of the idempotency of actions, including not generating extraneous notifications. This approach has the further efficiency that multiple notifications in response to changes are collapsed under load to a single notification, allowing less processing overhead compared to processing a queue of such notifications sequentially. The combination of these techniques allows the notification mechanism to be used without incurring the problems of a general procedure trigger mechanism.

In an embodiment, a data member that represents a collection is considered to have a default value for each entry corresponding to a key not present in the collection. Thus, adding an entry is effectively setting it to a non-default value and removing it is resetting it to the default value. For example, in a collection of object pointers, the default value is a null pointer. Moreover, the reactor provides a pointer to the input object and is passed the key for the entry in the collection that is changed. Consequently, the reactor can determine the new value and does not need extra information stored as part of the notification, such as whether the entry was added or deleted. An embodiment could be extended to use multiple entries for notifying data member and key in the reactor at the cost of extra space and code complexity, using the above collapsed object notification approach only when the amount of queuing reached the maximum number of entries allowed.

An embodiment can support separate queuing of notifications in an application specific basis by using immediate notification (no thread dispatch) and simply queuing this notification in a queue provided in the constraintSet state. A separate thread can then be dispatched to process the queued notification records, which should include an identifier for the data member and key.

Following the methods described above, a constraint set with constraints that have a single input can be realized by a translator that generates an internal representation of this constraint set in a form comparable to the C++ specification. The translator can then use well-known techniques to translate this internal representation to an efficient imperative representation that can be executed by the target execution environment.

A.2 Handling Multi-Input Constraints

In the simplest form, a constraint has a single input data member. That is, there is a single data member whose change can cause some action to be required. For example, a unidirectional constraint of a=b is only triggered by b changing. In the case of a single-input constraint, there is a single imperative sequence of code required to maintain this constraint, namely that invoked by notification of b changing (excluding the initialization of a from b).

However, in the more general case, a constraint has multiple inputs. For example, the second constraint of the constraint set in Example 1 has 2 inputs, namely report::total and accounting::avgPrice.

In a particular embodiment, the translator has an internal representation of a constraint in which one of its data member arguments is designated as a trigger. On processing the language to be translated and encountering a multi-input constraint in a constraint set, the translator replaces this constraint with multiple single-trigger constraint representations, one for each of the inputs to the original constraint set. (It may retain the original constraint specification for initialization.) Then, subsequent translation processing translates each single-trigger constraint to the associated code sequence based on the associated code template and the specific data member arguments to the single-trigger constraint. Each single trigger constraint has an imperative code template that specifies the imperative code sequence to be invoked in response to this trigger. The term "code template" is used because the actual executable code may differ based on the type, cardinality and other properties of the constraint data members.

Note that a so-called multi-directional constraint, one that responds to both data members on the left-hand side and the right-hand side of constraint relationship changing, is handled as another case of a multi-input constraint recognizing the left-hand side data members as being inputs. That is, it is transformed into several single-trigger constraints. A single-trigger constraint is a special case of a uni-directional constraint.

As described earlier, the translator can apply optimizations to the set of constraints, possibly eliminating some single-trigger constraints, as described for the report::cost constraint in Example 1.

In some cases, the imperative code associated with one single-trigger constraint differs from the others generated by the same original constraint. To use a simple example, if the constraint of "total=part1+part2+part3" is multi-directional then "total" is an input. In the case of "total" changing, the translator might produce the equivalent of the imperative code in Example 10.

EXAMPLE 10
Imperative code triggered by update of total part1 = total − (part2 + part3);

In an embodiment, the translator can be programmed with knowledge to recognize and be able to generate expressions for the desired cases of multi-directional constraints, generating an error on input processing when a multi-directional constraint is specified that it is not able to handle. The programmer is then required to realize the constraint using a combination of more basic constraints and/or imperative programming, if applicable. Because the translator can be programmed to recognize what it can handle (and thus also what it cannot handle), the translator does not produce an execution that is an incorrect realization of that specified. Moreover, because the main purpose here is to improve the conciseness of imperative programming by adding constraints as opposed to eliminating all means of expression other than constraints, the benefits of embodiments of the invention can be realized by a translator that handles the common cases of multi-directional constraints, which are relatively simple in many applications. Finally, it is possible to specify a constraint set that cannot be reduced to a set of efficient imperative programming sequences triggered by its inputs. Thus, a preferred translator implementation would produce an error message in this case, rather than silently providing a time consuming exhaustive search of the input and output space. Throwing exceptions in cases of excessively complicated constraints is in accordance with objectives of embodiments of the invention.

A.3 Abstract Syntax Tree (AST) Representation

In one embodiment, the translator records as it parses its input each constraint that is specified as a node in an abstract syntax tree, similar to an initialization statement node in a conventional compiler or interpreter, but extended with the capability of specifying a "trigger" data member. If a constraint is a multi-input constraint as above, subsequent processing inserts a single-trigger constraint node in the AST for each triggering data member dm of the original constraint at the point in the AST that dm can be modified. For example, in the constraint set of Example 1, the initial constraint node for the second constraint would be created in the AST to apply in the initialization of this constraint set (i.e. the constructor procedure) but also be duplicated in the implementation of the "onTotal" and "onAvgPrice" procedures for the reactors to the report and accounting input objects, respectively.

The translator then subsequently traverses the AST to complete the translation, only needing to consider single-trigger constraint specifications in each procedure representation, simplifying the output processing.

A.4 Local Constraint Implementation

In a special case, a constraint can be expressed in terms of one or more inputs that are defined within the same context as the output(s). In this case, the constraint can be implemented for those inputs by inserting the associated imperative code directly into locations at which the inputs are modified. In one embodiment, the translator identifies a constraint within a constraint set with this same context property and implements it, optimized as described. Alternatively, the programming language can provide a declarative context associated data members to specify such constraints. In Example 11, the declaration of the data member "total" is extended

EXAMPLE 11
Local Constraint Context

```
int total {
    = part1 + part2 + part3;
}
``` with a declarative constraint context containing the statement indicating that total is equal to the sum of data members part1, part2 and part3 (Here, equality to the data member called "total" is implicit based on this context being declared as an extension of the declaration of "total".) With this declaration, software can efficiently access the sum of these part data members, relying on this constraint to ensure that the "total" data member contains an update-to-date sum of these part data members at any time.

For the constraint in Example 11, the translator for this programming language inserts imperative instructions to initialize this data member to this sum when it is instantiated and to update the value of "total" at each location in the program at which any one of "part1", "part2" or "part3" are modified. For example, if "part2" is set to a new value at line 34 in the source code, the translator would insert after line 34 the equivalent of the following C++-like line:

EXAMPLE 12
Inserted imperative update code for "total"

```
total = part1 + part2 + part3;
```

Note that this code specifies an imperative statement to assign "total" to be the sum of "part1", "part2" and "part3". Thus, in the case that translator is a compiler, this code is directly compilable and optimized to a machine language implementation within the static type context of the constraint. Thus, the implementation is as efficient as a manually-specified imperative specification that provides the same functionality.

One or more data members can be defined local to a constraint set, using the standard syntax for a data member declaration, i.e. the type followed by name and other specification with no input, output or inputOutput qualifier. A constraint in the set can use one or more of these local data members as an input or output. In the case of input, the local optimization as above applies, namely directly invoking the constraint imperative processing rather than using the notification mechanism.

A.5 Constraints on Collection Data Members

In a preferred embodiment, the programming language allows declaration of complex data members such as "collections", data members that store or reference a variable number of other data members. For example, a collection data member called "child" storing references or pointers to objects of type Child indexed by a Name value type can be declared as:

EXAMPLE 13
Collection Data Member Declaration

```
Child::Ptr child[Name];
```

This declaration follows the conventional syntax for declarations of the type followed by the name and other qualifiers. The collection aspect is indicated by the presence of the "[Name]" specification which indicates that this collection data member is indexed by a value of type "Name".

To preserve the integrity of the underlying collection state, the language translator can generate one or more procedures for modifying the collection and require that all software modifying this collection invoke one of these procedures rather than directly accessing the data members used to implement the collection. These modifying procedures, each referred to as a "mutator", can include one to insert a value for a given key into the collection, to delete a specified member and possibly to increment the value of a given member, in the case of the collection member type supporting increment. In this embodiment, the translator can insert the imperative code to invoke the above notification callback mechanism in each of these mutator procedures, avoiding the need to insert notification code at every point in the application that would otherwise be modifying the collection. Similarly, the translator can insert imperative code required by a constraint specified in the same scope as this data member directly into each of these mutators. In this way, the generation of these mutator procedures reduces the code space required in an embodiment because it avoids duplicating of collection mutation and constraint implementation code.

An embodiment supporting collection data members can support constraints with more sophisticated semantics based on collection semantics. For example, the above "child" collection can support a constraint on a field of child, namely its "parent" field that requires that it be set to point to the parent object, as specified below.

EXAMPLE 14
Collection Backpointer Specified as a Constraint

```
Child::Ptr child[Name] {
    child::parent = this;
}
```

The "this" value refers to the enclosing scope object, as in C++. This constraint specifies setting the "parent" field of the Child to the instantiating parent object when the child is instantiated, and clearing this field when the child object is deleted from this collection. This constraint can be implemented entirely within the mutators for this collection implementation, if these procedures are the only means of updating this collection, as suggested above.

This example illustrates how a language supporting sophisticated data members directly such as collections allows constraints to have more sophisticated semantics than simple singleton data members. In a preferred embodiment supporting collections, the language can support a constraint between collections. For example, consider ChildMonitor as a type that reacts to callbacks from changes to an object of type Child as in Example 14. Then, a collection of ChildMonitors can be declared as corresponding to the Child collection in a specified parent object "arent1" as illustrated in Example 15:

EXAMPLE 15

Specifying a Collection Equality

```
ChildMonitor childMonitor[Name] {
    = parent1::child;
    childMonitor::parentMonitor = this;
}
```

The interpretation of the first constraint declaration is that there is to be a member of "child Monitor" for each Child object that is a member of the "child" collection of parent1. (The specification of "ChildMonitor" alone rather than "ChildMonitor::Ptr" as the type of this data member indicates that the ChildMonitor instance is to be instantiated in a preferred embodiment.)

This example also illustrates that multiple constraints can be specified within one context. In Example 15, the "parentMonitor" field associated with a childMonitor is constrained to point to the scope of childMonitor, matching the structure used with the "child" collection.

In the case that the specified "child" data member is part of a separately translated module, the translator implements this constraint by generating a procedure to be called by the notification callback mechanism when the "child" collection is modified and that adds or deletes an entry in this case depending on whether the child collection has added or deleted an entry in this modification. This same implementation may be used in the case of this constraint being specified in the same compilation unit as "child" if the scope of child contains no direct reference to "parent1".

The examples of constraints on collection members are specified in a local constraint context rather than as part of a constraint set for brevity. However, these types of constraints can also be specified in a constraint set.

A.6 Extended Constraint Set Constraint Implementation

In an extended constraint set such as illustrated in Example 2, one or more constraints can be specified that require overriding or extending the actions taken in the implementation of the original constraint set. In that example, the constraint on report::cost is redefined, so the actions taken in response to report::total and accounting::avgPrice have to change. In this case, the translator can generate for each input whose actions needs to change a reactor type that is a derived type of the reactor type in the original constraintSet, which overrides the functions that require changes with a modified or extended implementation. For example, the internal representation for derived reactor type for the accounting input object could be specified using C++ as in Example 16

EXAMPLE 16

Extended Constraint Set Input Implementation

```
class ExtendedReportMaintenance : public ReportMaintenance {
    ...
    class AccountingReactor : public
    ReportMaintenance::AccountingReactor {
        void onAvgPrice( ) {
            ...
        }
        void onOverhead( ) {
            ...
        }
    };
};
```

Furthermore, the constructor procedure for an extended constraint set instantiates the derived reactor types for these extended inputs. In the above example, the accounting input is realized using the derived type represented by ExtendedReportMaintenance::AccountingReactor in place of the ReportMaintenance::AccountingReactor used in the base constraint set. The . . . in the implementation of each of these procedures is to be replaced by the extended actions to perform for each of the corresponding data member notifications.

An extended constraint set can specify an extended input object that has additional data members and additional constraints using these additional data members as inputs. In this case, the internal representation in C++ would be a reactor class that is multiply-inherited from both the base reactor class as well as the notifiee class of the derived class of the input object. The derived reactor class then contains implementations of additional "on" functions as well as overriding implementations of those in the base reactor class. An overridden function in the reactor can invoke the corresponding function in the base reactor in the case that the actions of the overridden function are a superset of those in the base reactor, minimizing the reimplementation of actions in the derived reactor.

Using object-oriented inheritance in this form on both the input reactor implementation and the constraint set implementation, extended constraint sets are provided with minimal duplication of mechanism over the base constraint set.

B. Unified Code Generation Using Constraints

The translator should "understand" the structure of the base imperative code into which it inserts the imperative code segments that implement the constraints in the constraint set. In particular, the correct point in each implementation at which to add additional processing required for notification should be determined. For example, an insertion procedure for a collection may test when an object has a conflicting key and return an error rather than inserting the object. The instructions that take action on a constraint should be implemented so that they are not executed if the object is in fact not successfully added to the collection or if the specified entry in the collection already contains that value (as required to avoid notifications on update actions that make no state change). Moreover, the added instructions should be generated with consideration of the context provided by the imperative code. For example, it must not introduce local variables that conflict with those already defined by the procedure yet be able to introduce local variables as needed for the efficient constraint implementation. For efficiency, it should also use existing parameters and local variables to access state, to avoid redoing state access, computation and checking that the base imperative code already has performed, such as checking that a parameter is non-null.

In a preferred embodiment, the implementation of each collection mutator is specified in terms of one or more constraints. For example, the action of a mutator can be specified as constraining a data member to be the value of the value parameter to this procedure. Thus, there is a node in the AST corresponding to the data member and a node corresponding to the mutator procedure. A constraint expresses the single-trigger equality relationship from the mutator node to the data member node. Furthermore, the imperative code to support a generic notification callback mechanism described above can be generated by a specialized constraint as part of this implementation. Thus, the implementation of a mutator is generated by generating imperative code that is triggered by the mutator node. Note that this constraint is always a single-trigger constraint, triggered by the pseudo-data member corresponding to the mutator.

Using this approach, the translator then has a unified code generation module that outputs imperative code segments for mutators based on constraint nodes, using conventions that allow their composition according to the above correctness and efficiency considerations, whether the constraint node is to generate the body of the mutator or to implement a separate constraint that depends on this collection data member. In particular, the local data members defined within a constraint set and their associated means to access their values and update their values can be generated by single-trigger constraints specified as part of the AST internal representation.

C. Alias Data Members

In a preferred embodiment, a data member can be defined as an alias for another data member using a local constraint as illustrated in Example 17.

EXAMPLE 17

Specifying an Alias using Constraint

```
ChildMonitor::Ptr monitor = childMonitor;
```

The translator interprets "monitor" as an alias name for "childMonitor" in the sense that accessing "monitor" is equivalent to accessing "childMonitor" and "monitor" relies entirely on the "childMonitor" for its state. It is a constraint in the sense that "monitor" is constrained to the implementation of "childMonitor". In particular, if the childMonitor data member is changed, this change is reflected in the value of the monitor data member.

In a preferred embodiment, a collection procedure to access a collection data member, referred to as an accessor, can have its implementation generated by a constraint node similar to the above alias mechanism, further providing a unified constraint-based code generator module. An alias can also be defined in terms of an expression as illustrated in Example 18.

EXAMPLE 18

Specifying an Expression Alias using Constraint

```
bool isNullPtr = !ptr;
```

As a (pseudo) data member definition, an expression alias can be used to define an action to take when the condition changes, the same as using normal data members as constraint inputs.

In a preferred embodiment, a complex combination of events can be specified using a constraint set and expression aliases. This is illustrated in Example 19.

EXAMPLE 19

Specifying Complex Event Processing as a Constraint Set

```
constraintSet PortfolioMaintenance {
    input MarketTicker tkr;
    inputOutput Portfolio pf;
    output OrderBook orderBook;
    bool overTarget[Symbol] = tkr->price > pf->targetPrice;
    bool underLimit[Symbol] = (tkr->price < pf->limitPrice)
        &&(currentTime-pf->purchaseTime>minHoldTime);
    orderBook->sale = (overTarget || underLimit) ? pf->holding : 0;
}
```

The input market ticker is providing notification on security price changes. The portfolio object indicates the current holding and target price and limit price. The definition of local expression aliases for overTarget and underLimit are inputs to a constraint on the sale entry in the orderbook for this particular security. In this specification of constraints, the key or index value used with an input data member that is a collection is implicit and required to match across the various inputs and outputs of the constraint. In Example 19, the symbol for the security is used to index the portfolio and the tkr collection. Using this facility, complex event processing sequences can be specified in an imperative language as inputs to constraints.

D. Notification-Based Procedure Trigger

In a preferred embodiment, the ability to specify a procedure to trigger in response to a notification can also be provided, as illustrated in Example 20.

EXAMPLE 20

Specifying Trigger-Invocation Application Processing

```
File::Ptr fileDir[name] {
    : handleFile(name);
}
```

Here, the special ":" symbol indicates that the following statement is to be executed when the collection "fileDir" changes. This mechanism allows an application to specify imperative processing to be performed in response to changes to data members, handling requirements beyond relationships expressible as declarative statements in the language. More generally, it allows the specification of an imperative context within a declarative context as illustrated in Example 21.

EXAMPLE 21

Specifying Imperative Processing Inside of a Declarative Context

```
File::Ptr fileDir[name] {
    : {
        // perform imperative processing in response to fileDir changing
        ...
    }
}
```

In this example, arbitrary imperative code, indicated by the " . . . " is specified to be invoked in response to the "fileDir" data member changing. To fit within the restricted semantics of the notification facility, the procedure should be written to be idempotent, (i.e. execution of the procedure multiple times on the same inputs is completely equivalent to a single execution of the procedure, as for constraints) rather than taking a completely arbitrary action.

A procedure trigger can be specified with an expression alias so that it is only invoked when the expression is true or non-zero. The language translator inserts imperative code that is invoked on changes to data members that are part of the expression and invokes the procedure when the expression evaluates to true or non-null.

This mechanism demonstrates that a procedure trigger mechanism can be also supported as an extension of the language and mechanism used to specify and implement constraint sets, albeit as restricted by the constraint-oriented semantics of the notification facility.

E. Checking with a Constraint

In a preferred embodiment, a checking constraint can be provided by generating imperative code that checks the specified relationship against the modification to the data member before it takes place and throws an exception if the modification would cause the specified relationship to be violated. The exception ensures that the modification does not take place, assuming a modern programming language in which errors are handled by throwing exceptions, such as C++, Java and C#. Thus, the imperative code that maintains the relationship is throwing of an exception. Specification of a check constraint can be done as in Example 22, in this case restricting the speed data member to be in the range between 0 and 100.

---
EXAMPLE 22
Specifying Checking with a Constraint

```
MilesPerHour speed {
    check speed >= 0 && speed <= 100;
}
```
---

In a preferred embodiment, the implementation of the check form of constraint takes advantage of the unified constraint-based generation, facilitating the insertion of check constraint code before the modification takes place, as is required by check constraint semantics. That is, the unified constraint-based generation can determine the point in the imperative code associated with the mutator to insert the additional imperative code to perform the check.

F. Initialization with a Constraint

In a preferred embodiment, initialization is handled as a specific case of a constraint, generating code that sets the data member to the specified value at the point at which a data member is initialized, only. This is illustrated in Example 23 with the initialization of the "speed" data member to "initialSpeed".

---
EXAMPLE 23
Specifying Initialization with a Constraint

```
MilesPerHour speed {
    'default = initialSpeed;
}
```
---

The prefix "'" is used to indicate a property of the data member. The "'default" property corresponds to the initial value for the data member.

G. Specification of Data Member Properties with Constraints

In a preferred embodiment, a data member may have numerous properties including the initial or default value specified above. For example, a collection data member may have the property of "ordering" which can take on the values of "unordered", "by insertion" or "by key". The local constraint declarative context associated with the data member can be used to specify these properties, similar to the specification of initialization provided above, as illustrated in Example 24.

---
EXAMPLE 24
Specifying Properties by Constraint

```
File::Ptr fileDir[name] {
    'ordering = fileDirOrdering;
}
```
---

In this case, if fileDirOrdering is a data member, the translator inserts imperative code that changes the implementation of the "fileDir" collection as needed based on changes to the fileDirOrdering data member. In these examples, the name of the property is preceded by a "'" to indicate it is a property of the data member of the declarative scope, rather than a reference to another data member.

In a preferred embodiment, the properties of a data member are set by default to the most commonly applicable values to minimize the need to explicitly specify property values. In a preferred embodiment, the translator allows the specification of multiple constraints within a single local constraint context, including different data member properties, at the same time detecting logical conflicts between constraints if those specified have one or more conflicts.

H. Parser Generator Using Constraints

In a preferred embodiment, a constraint set data member can be defined as an alias for an and-or tree of other data members using one or more constraints. The other data members may be similar aliases. A complex alias of this form can be viewed as non-terminal symbol in a grammar. The specification of a complex alias of this nature is illustrated by a constraint as illustrated in Example 25.

---
EXAMPLE 25
Specifying a language grammar rule as a constraint

```
bool typeDecl = "type" name '{' bodyNode '}' | "type" name ';' {
    : handleType( );
}
```
---

Here, data member names or literals separated by spaces are treated as concatenation or conjunction while the special symbol "|" indicates an "or" connective or disjunction. In Example 25, the data alias "typeDecl" is defined to be the string "type" followed by a name data alias followed by the literal character '{' followed by a bodyNode data alias followed by the literal character '}' or the string "type" followed by a name data alias followed by the literal character ';'.

This constraint specification causes the language translator to insert code that handles a callback in response to both the first condition and the second condition, which in turn is structured as state and processing that detects the sequence of data members corresponding to each of the data aliases. The "handleType" procedure is then invoked when this "typeDecl" alias data member is recognized to be true.

A terminal symbol in a grammar is specified as an alias that is defined in terms of a constant or literal, as illustrated in Example 26.

---
EXAMPLE 26
Specifying a terminal symbol in a grammar

```
bool newToken = inputStream->token == "new";
```
---

Here, "newToken" is true when the input token is set to the string "new".

The constraintSet for a parser typically has a single input, i.e. the "inputStream" object used in Example 26. The other constraints are typically defined in terms of the expression aliases defined within the constraint set.

Using this mechanism, an application can specify a constraint set that forms a "grammar" describing a language syntax. In particular, each "token" event or basic event corresponds to an expression alias corresponding to a data member becoming equal to a literal value. Each "non-terminal" corresponds to other expression aliases. Further processing can be attached to these non-terminals by additional constraints or by using procedure triggers. Using this facility, the translator can provide the capability of a parser generator within an imperative programming language. That is, this translator can translate the constraint set to an internal language grammar representation and then use techniques well-known in the art for parser generators to generate the imperative code for the implementation of an efficient parser. This approach allows a language translator to be specified within a single programming language for ease of specification and maintenance while still providing the benefits of a declarative specification of the grammar and auto-generation of the required parser code. That is, in the context of compilers and interpreters that have normally used a separate parser generator for this task, the constraint set mechanism allows the programming language to include the capabilities of a parser generator within the imperative programming language, i.e. within a single programming environment.

H. Constraint Exception Notification

In a particular embodiment, the translator can generate a notification when an action to restore the constraint relationship fails. For example, the constraint on non-negative "difference" data member in Example 27

EXAMPLE 27

```
NonNegative difference {
  = obja->count1 - objb->count2;
}
``` cannot be maintained if count1 is less than count2. Thus, the translator generates imperative code to invoke the notification mechanism in this case. An application can specify imperative processing to perform in this case using an expression alias corresponding to count1 less then count2 which invokes a normal constraint procedure or procedure trigger dependent on this expression alias. Thus, it can cause actions to be invoked to react to the failure to maintain the original constraint, possibly undoing changes to the state that lead to this failure.

I. Application-Defined Constraint Operators

In a particular embodiment, application-defined constraint operators can be defined with a name and a list of parameter inputs and outputs. When the translator encounters an application-defined constraint operator, as specified by its name, it generates instructions to instantiate the constraint operator as an object and connects the argument inputs to the parameter inputs and the argument outputs to the parameter outputs. The application-defined constraint can correspond to an object with input interfaces and output interfaces and specialized application-specific processing between these, possibly provided by the procedure trigger mechanism coupling to imperative programming. Using this mechanism, an arbitrary specialized algorithm can be invoked using a concise constraint specification yet the translator and programming language do not need to include all possible application-specific algorithms.

In one embodiment, the constraint operator implementation may be specified in a type-parameterized form, i.e. a template in C++ terminology. This is referred to as a constraint operator template. In this case, the inputs and outputs are mapped to the specific types of the argument inputs and outputs. Consequently, the same constraint operator can be used with different types as long as they include the required data members.

In an embodiment, a specialized run-time constraint set can be defined that corresponds to the conventional constraint programming using the same basic mechanism as used by the application-defined constraint templates. In particular, when a constraint set is encountered in translation that is designated as a run-time constraint set, code is inserted to instantiate a constraint store object corresponding to this constraint set, and a special constraint object, similar to that used with application-defined constraints, but with its specified relationship as an input argument. At run-time, when this object is instantiated, it records the relationship expression associated with this constraint in the associated run-time constraint store. It further registers its dependent data members with the notification facility. The constraint solver is then invoked on this constraint store when a constraint is added or removed or when a dependent data member of one or more of the constraints in the store is modified. Thus, this facility provides the conventional general-purpose constraint solver approach, but localized to the subset of constraints specified in this form, and invoked by the notification mechanism rather than requiring every assignment or mutator action to be realized as the addition of a constraint.

These facilities allow an application to go beyond the "built-in" constraint directly supported by the translator to take advantage of specialized application-specific algorithms that have superior performance to a general-purpose constraint solver and yet use a general-purpose constraint solver for situations in which no better algorithm is known, such as various combinatoric and optimization problems. Conversely, one can view the notification mechanism as allowing a general-purpose constraint solver to be used without changing the imperative storage model beyond providing a notification facility, and further allowing optimizations for cases in which superior imperative solutions are known, as specified by application-specific constraint operators and built-in (to the language) constraint operators.

The possible relationships specified by a constraint can be classified according to their triggering properties, the amount of state and the temporal component. The handling of multi-trigger constraints was described earlier. Stateful relationships can be handled with data members declared local to a constraint set. Temporal properties can be implemented by introducing a scheduling delay in one of these objects between the notification and the consequential execution of imperative actions from this notification, using the thread mechanism described earlier or a similar processing control facility. These capabilities together with support for all base operators and compositions of those operators provide a comprehensive constraint capability.

J. Representation-Specific Constraints

In many applications, there is a need to implement a set of constraints between the normal in-memory representation of state and other representations, such as string representation, untyped representation and network representations. For example, an adapter is required to interface between an untyped programming environment, such as scripting language, command line interface or graphic user interfaces and the typically strongly typed environment of practical programming languages. In particular, a command line interpreter or graphic interface provides input specification in terms of strings or pointers to objects, e.g. user interface framework objects, that are not typed consistent with the internal application objects. This adapter needs to take a string specification of the data member, key and value and make the actual strongly typed application object consistent with these values or throw an exception. (The application object is implicit with the adapter object because there is an adapter object per application object.)

In a preferred embodiment, the translator allows the specification of a representation as part of specifying a constraint. One example of a representation is a particular network protocol representation of an input or output. The representation can be designated by a qualifier on the input or output or on the particular constraint. The default representation is the normal in-memory representation.

In a preferred embodiment, the translator further supports the addition of an extension module per representation into the translator that handles the translation of constraints associated with this specific representation. When the translator encounters a constraint with a non-default representation, it invokes the associated representation module to translate this constraint.

In the case of distributed operation, a representation module is provided for the network representation, handling a constraint set per type that constrains the data members to a representation in the network inputOutput connection specified as part of this constraint set. The resulting imperative code maintains the data members of the type to be consistent with the network representation which, by connecting an instance of a type to another instance over a network connection, ensures that these two instances remain consistent. In particular, for each type T that needs to be accessed over the network, the translator generates an adapter type that reacts to updates to an object of type T by transmitting the update over a network connection, and is similarly able to receive such an update and transform it into a call to the same type of object, setting that object's state according to this update. Furthermore, the object-scope notification is used to cause the entire object state to be transmitted over the network, to handle resynchronization of the connection on network failure or initialization on setup.

Using this mechanism on each side of a network connection with the real object on one end and a "proxy" object of the same type on the other end, the proxy object is constrained to maintain the same state values as the real object. Moreover, it can behave exactly the same as the real object, including generating notifications on the remote node to invoke constraints, allowing the implementation of distributed constraints as described in Section K.

In an embodiment, another representation corresponds to an untyped representation. A constraint set can then specify a relationship between the normal typed representation and this untyped representation using constraints specified with this representation identification. In particular, a data member specified in an untyped representation can, by a constraint, invoke on modification the imperative processing to convert the untyped value to the appropriate typed value (with appropriate checking and error notification) and then perform the update on the corresponding typed data member.

In a preferred embodiment, the translator automatically generates the constraint set for an application-defined type given a specification of a representation. In particular, for each data member of the application-defined type, the representation module adds an equality constraint to the constraint set with an input being this data member and output being the target representation object, such as a network stream in the case of network representation.

K. Distributed Constraint Sets

In a distributed application, a constraint set can specify inputs and outputs that are implemented on different nodes of the system. In an embodiment, a proxy is created for each of the remote objects to be specified as an input or output to the constraint set. The constraint set object is then instantiated with a pointer to each of these (proxy) objects. The proxy objects are implemented using representation-based constraints, as described earlier. Consequently, when a remote object is updated, the update is propagated to each proxy object, which then causes a generation of a notification, the same as a local object. This notification invokes the constraint processing the same as for a local object. If the constraint processing modifies one of these proxy objects, the update is propagated back to the real object as well as generating a notification to local clients of the proxy object.

Using this embodiment, a constraint set can be instantiated and executed on a node in a distributed application that is remote relative to both its inputs and output with no change in the imperative processing and with efficient execution of this constraint processing.

L. Procedures Implemented with Constraints

The following examples relate to providing an efficient implementation of procedural constructs within a constraint framework based on notification and callback, and can be regarded providing more extensive examples of the principles described above in connection with FIGS. 6-12.

For example, a simple procedure to power up a device can be specified as:

EXAMPLE 28: Device Power up

```
procedure powerUp( device ) returns status {
    device->state = start;
    waitDevice:
        wait device->ready==true 1.5 {
            device->state = operating;
            status = ok;
        }
        else {
            device->state = shutdown;
            status = failed;
        }
}
```

Here, the procedure starts the device by setting its state to start, waits for the device to be ready (at the statement labeled "waitDevice") and then starts normal operation, as specified in the wait block. However, if the device fails to be ready after 1.5 seconds, as specified in this same wait statement, it reports a failure and terminates execution, as in the associated "else" block.

The specification of the procedure of Example 28 as part of a constraint set is illustrated below.

EXAMPLE 29: Device Power up declared in a Constraint Set

```
constraintSet DeviceControl {
    inputOutput deviceConfig DeviceConfig::Ptr;
    output deviceStatus DeviceStatus::Ptr;
    procedure powerUp {
        deviceStatus->state = start;
    waitDevice:
        wait deviceConfig->ready==true 1.5 {
            deviceStatus->state = operating;
            deviceStatus->mode = ok;
        }
        else {
            deviceStatus->state = shutdown;
            deviceStatus->mode = failed;
        }
    }
    powerUp : deviceConfig->state==init;
}
```

In this case, the inputs and outputs are declared at the constraint set scope and are implicit to the procedure. Moreover, the triggering constraint is declared in the constraint set scope as well, in this case on the last line in the example by the expression of the deviceconfig state being set to init. This line is a notification-based procedure trigger (as in section "D" above) with the "powerUp" procedure being the triggered procedure and the notification occurring when deviceConfig::state is set to init.

In a pure constraint interpretation of the example procedure, an implementation would entail adding a constraint on deviceStatus→state to be equal to start at the next time step, then removing this constraint and adding a constraint that the time is now 1.5 seconds later or the deviceconfig→ready field is equal to true. Then, depending on which of the conditions satisfies the constraint, removing this constraint and either adding a constraint corresponding to the deviceStatus state being equal to operating or to shutdown, and similarly for the deviceStatus::mode field. This modeling of procedural semantics in a constraint execution environment also requires persistence to variable values as a result of assignment (i.e. the value does not change when a constraint is removed except in response to an explicit requirement of a remaining constraint). Clearly, an implementation that actually performed in this way would be extremely inefficient, even if these constraints were in turn translated to callback subroutines that were registered and deregistered on each step.

In the preferred embodiment, the translator would realize the implementation of the powerUp procedure of Examples 28-29 as follows, using a C++-like programming representation to illustrate its specific realization. First, the translator would add to a class definition corresponding to the constraintSet DeviceControl, the declaration of an enum for the state of this procedure and a data member to store this state, similarly for the exception result. These data elements correspond to the procedure context state described earlier. And, it adds declaration of four member functions corresponding to the procedure, exception handling for the procedure, deviceconfig notification handling and time notification handling, as illustrated in Example 30.

---

EXAMPLE 30: DeviceControl class declaration

---

```
class DeviceControl {
    ...
    enum PowerUp_Enum {
        powerUp_NullCase_,
        powerUp_waitDevice_
    };
    PowerUp_Enum_ powerUp_Case_;
    Exception powerUp_Exception_;
    void powerUp( );
    void powerUpHandleException( );
    void powerUpHandleTime( );
    void powerUpHandleDeviceConfig( );
    ...
}
```

---

Here, the " . . . " indications both before and after the above additions to the DeviceControl constraintSet class indicate that additional code is provided as part of the constraintSet implementation independent of the procedure implementation, as required for constraintSet implementation. Such constraint set implementation code is described in detail above (e.g., sections A-K).

The implementation of the powerUp member function as the initiation subroutine can be realized in a C++-like form as in Example 31.

---

EXAMPLE 31: powerUp Member Function Implementation

---

```
void
DeviceControl::powerUp( ) {
    switch(powerUp_Case( )) {
        case powerUp_NullCase_ : {
            deviceStatus_->stateIs(DeviceStatus::start_);
            powerUp_Case_ = powerUp_waitDevice_;
            if(deviceConfig( )->ready( )==true) {
                powerUpHandledeviceConfig( );
            }
            else {
                powerUp_Time_->timeMinIs(powerUp_Time( )->time( )+1.5);
            }
            break;
        }
        default: {
        }
    }
}
```

---

In effect, if invoked when its associated enum data member is set to the initial state, it sets the device status to start, sets this enum case data member to the next state, namely waitDevice, and then checks if the deviceconfig::ready data element is already true, invoking another of the generated member functions, the powerUpHandledeviceConfig function if so, and otherwise sets the time notification callback time to the current time plus 1.5 seconds. If invoked in any other state, its default behavior is to take no action and return, because the powerUp procedure is already in execution. If other actions are specified for the procedure, they would be inserted by the translator into the "default" case above or in separate case statements in the above switch statement.

The member function handling notifications from the deviceconfig input, namely powerUpHandleDeviceConfig, can be implemented as indicated by the following C++-like code in Example 32. This code corresponds to a callback subroutine in the translator algorithm description above.

---

EXAMPLE 32: powerUpHandleDeviceConfig Implementation

---

```
void
DeviceControl::powerUpHandledeviceConfig( ) {
try_powerUpHandledeviceConfig:
    try {
        switch(powerUp_Case_) {
            case powerUp_NullCase_ : {
                break;
            }
            case powerUp_waitDevice_ : {
                if(deviceConfig( )->ready( )==true) {
                    powerUp_Time_->timeMinIs(Fwk::endOfTime);
                    deviceStatus_->stateIs(DeviceStatus::operating_);
                    deviceStatus_->modeIs(DeviceStatus::ok_);
                    powerUp_Case_ = powerUp_NullCase_;
                }
                break;
            }
            default: {
            }
        }
    }
    catch(...) {
        powerUpHandleException( );
        goto try_powerUpHandledeviceConfig;
    }
}
```

---

This member function only performs an action if the powerUp enum data element has the waitDevice value, as set in the powerUp procedure, allowing it to ignore notification callbacks from the deviceConfig input when it is not appropriate to take action. In effect, the imperative code that performs actions associated with the next step after waiting for the device, in the case block labeled powerUp_waitDevice_, is enabled by the enum data element only when this data element has this value, providing an efficient means to enable/disable these constraint actions compared to actually adding and removing constraint triggering registrations. Note that the DeviceControl constraintSet could include other procedures and constraints that have deviceConfig as an input and the deviceConfig object may be changing in ways of no relevance to the powerUp procedure so there may be many notification callbacks to this member function that are properly ignored by the switch statement as it is structured.

If the powerUp procedure included other statements that involved waiting on conditions dependent on the deviceConfig input, the translator would add an additional case block to this member function for each such condition.

Note that this implementation has the switch statement embedded in a "try" block, causing any exception to be caught in the associated catch block, which calls the associated exception-handling member function, powerUpHandleException, and then retries the action by executing a goto to the top of the try block. This structure allows the powerUpHandleException implementation to terminate the procedure by setting the enum data member to powerUp_NullCase_, or perform some action and return, causing the current step in processing that caused the exception to be retried.

The member function handling timeout notifications can be implemented as follows, using a similar C++-like specification:

---
EXAMPLE 33: powerUpHandleTime Implementation

```
void
DeviceControl::powerUpHandleTime( ) {
try_powerUpHandleTime:
    try {
        switch(powerUp_Case( ) ) {
            case powerUp_NullCase_ : {
                powerUp_TimeIs(0);
                break;
            }
            case powerUp_waitDevice_ : {
                deviceStatus_->stateIs(DeviceStatus::shutdown_);
                deviceStatus_->modeIs(DeviceStatus::failed_);
                powerUp_Case_ = powerUp_NullCase_;
                break;
            }
            default: {
            }
        }
    }
    catch(...) {
        powerUpHandleException( );
        goto try_powerUpHandleTime;
    }
}
```
---

In this implementation, if called when the enum data element has the value powerUp_waitDevice_, it takes the action of the "else" block in the original powerUp procedure specification. This can only occur if the procedure is waiting for the device and the specified time period of 1.5 seconds has elapsed before a notification is received from the deviceconfig input indicating that it is ready. This member function otherwise ignores timeout callbacks, which could arise if other procedures or constraints of this constraintSet require time-based notifications. It follows the same exception catching and handling structure as the implementation in Example 32.

If the powerUp procedure had additional statements that depended on time-based notifications, the translator would add additional case blocks to the switch statement in this procedure corresponding to these other statements, labeled, and thus controlled, by the enum data element to determine whether they take effect or not on a time notification.

The implementation of the generated member function handling exceptions thrown in the powerUp procedure, powerUpHandleException, can be realized as follows using a C++-like specification:

---
EXAMPLE 34:

```
void
DeviceControl::powerUpHandleException( ) {
    try {
        switch(powerUp_Case( ) ) {
            default: {
                powerUp_Exception_ = exception( );
                powerUp_Case = powerUp_NullCase_;
            }
        }
    }
    catch(...) {
    }
}
```
---

This implementation records the exception and sets the enum data element to the null case to indicate termination of the powerUp procedure execution. If the powerUp procedure specified actions to be performed on an exception in a particular processing step, the translator would add a case corresponding to that processing step to the above implementation, taking those actions when this exception-handling procedure is called when the enum data element indicates the procedure has incurred an exception in this processing step. The actions can include:

reporting additional information before terminating,
performing some fix up actions and retrying the failing step, and/or
continuing with other processing.

In this way, the exception-handling actions can be specific to the processing step incurring the exception as well as the type of exception and other state accessible to the exception-handling code.

The implementation of this procedure is enclosed in a "try" block as well to handle the case of more sophisticated actions that may themselves throw an exception during the exception handling processing. If the translated procedure included local variables that need to be preserved across the processing steps, the translator would add corresponding data elements to the constraintSet class in addition to the enum and exception data elements. It would also insert code to save and restore their values across steps as required.

M. Nested Procedures Implemented with Constraints

A procedure call statement embedded in another procedure can be interpreted as a one-time constraint triggering the procedure. If the triggered or called procedure is declared outside the scope of a constraint set, this invocation is translated as instantiating the associated constraint set, registering the inputs and binding the outputs and then triggering the execution of the procedure constraints, and then waiting for the return output to be set.

If the called procedure is declared inside of a constraint set, the statement is equivalent to triggering the procedure to execute by an explicit triggering constraint except the call statement is treated as waiting on the resulting value of the procedure.

N. Optimizations for Procedures Implemented with Constraints

In a preferred embodiment, the translator does not generate a callback subroutine for any input of the constrainer that is not used by that procedure such that a callback subroutine is required.

In a preferred embodiment, as a code space optimization, the translator can generate a shared execution subroutine for each case number that would otherwise entail placing code to two or more callback subroutines and insert a call to the shared execution subroutine from each of such two or more callback subroutines. In this way, common code is generated in one place, saving on code space at the minor cost of an additional subroutine call.

In a preferred embodiment, if the time callback facility is known to provide accurate timeout callbacks, the translator can eliminate the conditional block from the time callback subroutine, recognizing that the callback subroutine will only be called with its case statement number set to this case when the timeout has accurately expired. In the preferred embodiment, there is a callback registration with the system time facility for each event-sequenced procedure in execution. Because a procedure can only be waiting on at most one timeout at a given time, it sets the state of this callback registration to only callback at the timeout time specified by this wait statement. Moreover, the procedure implementation can reset this timeout callback time if the wait condition becomes true before the timeout has expired. Consequently, the procedure implementation can rely on its timeout callback subroutine only being invoked when the timeout has occurred for the current wait statement. Thus, the timeout callback procedure does not need to check when invoked that the timeout period has in fact elapsed. In contrast, if the time callback subroutine is simply invoked every K milliseconds, the time callback subroutine needs to explicitly check if the timeout has expired for a current wait statement, if any, on each invocation.

In a preferred embodiment, the translator inserts code to test the specified condition and if the condition is true, branches to the associated next case to execute. In particular, if this next case is the next case consecutively in the same switch statement, the code is specified to just fall through to this subsequent case block. (Otherwise, it branches explicitly to the associated case block.) If the case is only implemented in some other callback subroutine, it directly invokes this separate callback subroutine. This optimization can eliminate the overhead of invoking the separate callback subroutine by reliance on the general notification and callback mechanism.

In a preferred embodiment, the translator performing the above optimization can further: 1) provide an additional entry point to the case after the code that restores the context, if any; 2) insert the condition testing code before the conditional test; and 3) cause the conditional branch to target the additional entry point. It thereby allows the execution in the optimized case of the condition holding to avoid the overhead of context saving and restoring. An example of this approach is shown on FIG. 12b, where if the condition a<b holds when it is first tested (i.e., in block i), control jumps directly to the wait body in block i+1.

The translator can recognize when a labeled non-wait statement is not referenced (by a goto statement) outside of the code in the case statement before the label and the case statement after the label, and then combine these two cases into one. The combining of the two cases eliminates the overhead of switching from one case to the subsequent case.

Preferably, translation methods according to embodiments of the invention are implemented on a computer to provide rapid and automatic translation of input code to a computer executable output representation according to the above-described principles. Such translation can be regarded as automatic transformation of a technical article (i.e., the input code) to another form (i.e., the computer executable output representation).

The preceding description has been by way of example as opposed to limitation. It will also be apparent to art workers how to implement principles of embodiments of the invention in various similar situations. In particular, providing code for automatically generating intermediate notification and reactor representations, as described above, from specification of constraints in an input source program can be accomplished by methods that are well-known in the art of programming language transformation, and are accordingly not described herein.

The invention claimed is:

1. A method executed by a processor for automatically translating input code to a computer executable imperative output representation, the method comprising:
   providing an input source program expressed in a constraint programming language that also provides for specification of event-sequenced imperative procedures, wherein said input source program includes one or more constraints and one or more event-sequenced imperative procedures specified in accordance with said constraint programming language;
   automatically translating said input source program to an intermediate imperative representation;
   wherein said intermediate imperative representation provides an imperative representation of said one or more constraints with notification and callback code for constraints;
   wherein said intermediate imperative representation provides an imperative representation of said one or more event-sequenced imperative procedures with notification and callback code for events;
   automatically translating said intermediate imperative representation to said computer executable imperative output representation; and
   providing said computer executable imperative output representation as an output.

2. The method of claim 1, wherein said notification and callback code for events comprises callback subroutines for inputs to said event-sequenced imperative procedures, wherein each of said callback subroutines comprises a switch statement having one or more case blocks, and wherein control flow is provided by setting case variables of said switch statements.

3. The method of claim 2, wherein said control flow includes one or more constructs selected from the group consisting of: conditional wait, return, goto, statement label, and throwing an exception.

4. The method of claim 2, further comprising combining adjacent case blocks having no external entry points other than the first statement of a first of said adjacent case blocks into a single case block.

5. The method of claim 1, further comprising providing common code optimization for said notification and callback code for events.

6. The method of claim 1, wherein a call to one of said event-sequenced imperative procedures is translated to initiation of procedure execution and a conditional wait construct for procedure termination.

7. The method of claim 1, wherein translation of a conditional wait construct includes providing an initial conditional check and providing for conditional checks driven by variable changes, and wherein if said initial conditional check is true, control transfers directly to the true branch of the conditional checks driven by variable changes.

* * * * *